US006761870B1

(12) United States Patent
Smalley et al.

(10) Patent No.: US 6,761,870 B1
(45) Date of Patent: Jul. 13, 2004

(54) GAS-PHASE NUCLEATION AND GROWTH OF SINGLE-WALL CARBON NANOTUBES FROM HIGH PRESSURE CO

(75) Inventors: Richard E. Smalley, Houston, TX (US); Ken A. Smith, Houston, TX (US); Daniel T. Colbert, Houston, TX (US); Pavel Nikolaev, Houston, TX (US); Michael J. Bronikowski, Pasadena, CA (US); Robert K. Bradley, Houston, TX (US); Frank Rohmund, Huttlingen (DE)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 09/830,642

(22) PCT Filed: Nov. 3, 1999

(86) PCT No.: PCT/US99/25702

§ 371 (c)(1),
(2), (4) Date: Jul. 1, 2002

(87) PCT Pub. No.: WO00/26138

PCT Pub. Date: May 11, 2000

Related U.S. Application Data

(60) Provisional application No. 60/161,728, filed on Oct. 27, 1999, provisional application No. 60/117,287, filed on Jan. 26, 1999, provisional application No. 60/114,588, filed on Dec. 31, 1998, and provisional application No. 60/106,917, filed on Nov. 3, 1998.

(51) Int. Cl.$^7$ .................................................. D01F 9/12
(52) U.S. Cl. .............................. 423/447.3; 423/447.1; 423/445 R
(58) Field of Search ........................... 423/447.3, 447.1, 423/445 B, 455 R

(56) References Cited

U.S. PATENT DOCUMENTS

| 4,663,230 A | 5/1987 | Tennent ...................... 428/367 |
| 4,876,078 A | 10/1989 | Arakawa et al. .......... 423/447.3 |
| 5,039,504 A | 8/1991 | Kageyama et al. .......... 423/448 |
| 5,165,909 A | 11/1992 | Tennent et al. ............ 423/447.3 |
| 5,374,415 A | 12/1994 | Alig et al. ................. 423/447.3 |
| 5,424,054 A | 6/1995 | Bethune et al. ........... 423/447.2 |
| 5,707,916 A | 1/1998 | Snyder et al. ............... 502/180 |
| 5,780,101 A | 7/1998 | Nolan et al. ................ 427/216 |
| 5,877,110 A | 3/1999 | Snyder et al. ............... 502/180 |
| 5,965,267 A | 10/1999 | Nolan et al. ................ 428/408 |
| 6,221,330 B1 | 4/2001 | Moy et al. ................. 423/447.3 |
| 6,235,674 B1 | 5/2001 | Tennent et al. ............. 502/174 |
| 6,333,016 B1 | 12/2001 | Resasco et al. ........... 423/447.3 |
| 2002/0127170 A1 | 9/2002 | Hong et al. ............... 423/447.3 |

FOREIGN PATENT DOCUMENTS

| GB | 2 248 230 B | 4/1992 |
| JP | 06322615 | 11/1994 |
| JP | 09188509 | 7/1997 |
| WO | WO 89/07163 | 8/1989 |
| WO | WO 97/09272 | 3/1997 |
| WO | WO 98/05920 | 2/1998 |
| WO | WO 99/06618 | 2/1999 |
| WO | WO 00/17102 | 3/2000 |
| WO | WO 00/73205 | 12/2000 |

OTHER PUBLICATIONS

Kataura et al., "Formation of Thin Single–Wall Carbon Nanotubes by Laser Vaporization of Rh/Pd–Graphite Composite Rod," *Japanese Journal of Applied Physics*, vol. 37, pp. L616–L618 (May 15, 1998).
Hafner et al., "Catalytic growth of single–wall carbon nanotubes from metal particles," *Chemical Physics Letters*, vol. 296, pp. 195–202 (Oct. 30, 1998).
Dai et al., "Single–wall nanotubes produced by metal–catalyzed disproportionation of carbon monoxide," *Chemical Physics Letters*, vol. 260, pp. 471–475 (Sep. 27, 1996).
Cheng et al., "Large–scale and low–cost synthesis of single–walled carbon nanotubes by the catalytic pyrolysis of hydrocarbons," *Applied Physics Letters*, vol. 72, No. 25, pp. 3282–3284 (Jun. 22, 1998).
Colomer et al., "Synthesis of single–wall carbon nanotubes by catalytic decomposition of hydrocarbons," *Chemical Communications*, pp. 1343–1344 (1999).
Ebbesen et al., "Large–scale synthesis of carbon nanotubes," *Nature*, vol. 358, pp. 220–222, (Jul. 16, 1992).
Ebbesen, "Carbon Nanotubes," *Annual Review of Materials Science*, vol. 24, pp. 235–264 (1994).
Iijima, "Helical microtubules of graphitic carbon," *Nature*, vol. 354, pp. 56–58 (1991).

(List continued on next page.)

*Primary Examiner*—Stuart L. Hendrickson
*Assistant Examiner*—Peter J Lish
(74) *Attorney, Agent, or Firm*—Ross Spencer Garsson; Robert C. Shaddox; Winstead, Sechrest & Minick P.C.

(57) ABSTRACT

The present invention discloses the process of supplying high pressure (e.g., 30 atmospheres) CO that has been preheated (e.g., to about 1000° C.) and a catalyst precursor gas (e.g., Fe(CO)$_5$) in CO that is kept below the catalyst precursor decomposition temperature to a mixing zone. In this mixing zone, the catalyst precursor is rapidly heated to a temperature that results in (1) precursor decomposition, (2) formation of active catalyst metal atom clusters of the appropriate size, and (3) favorable growth of SWNTs on the catalyst clusters. Preferably a catalyst cluster nucleation agency is employed to enable rapid reaction of the catalyst precursor gas to form many small, active catalyst particles instead of a few large, inactive ones. Such nucleation agencies can include auxiliary metal precursors that cluster more rapidly than the primary catalyst, or through provision of additional energy inputs (e.g., from a pulsed or CW laser) directed precisely at the region where cluster formation is desired. Under these conditions SWNTs nucleate and grow according to the Boudouard reaction. The SWNTs thus formed may be recovered directly or passed through a growth and annealing zone maintained at an elevated temperature (e.g., 1000° C.) in which tubes may continue to grow and coalesce into ropes.

115 Claims, 9 Drawing Sheets

OTHER PUBLICATIONS

Iijima et al., "Single–shell carbon nanotubes of 1–nm diameter," *Nature*, vol. 363, pp. 603–605 (Jun. 17, 1993).

Bethune et al., "Cobalt–catalysed growth of carbon nanotubes with single–atomic–layer walls," *Nature*, vol. 363, pp. 605–607 (Jun. 17, 1993).

Ajayan et al., "Growth morphologies during cobalt–catalyzed single–shell carbon nanotube synthesis," *Chemical Physics Letters*, vol. 215, No. 5, pp. 509–517 (Dec. 10, 1993).

Zhou et al., "Single–walled carbon nanotubes growing radially from $YC_2$ particles," *Applied Physics Letters*, vol. 65, No. 12, pp. 1593–1595 (Sep. 19,1994).

Seraphin, "Single–Walled Tubes and Encapsulation of Nanocrystals into Carbon Clusters," *Journal of Electrochemical Society*, vol. 142, No. 1, pp. 290–297 (Jan. 1995).

Saito et al., "Carbon Nanocapsules Encaging Metals and Carbides," *J. Phys. Chem. Solids*, vol. 54, No. 12, pp. 1849–1860 (1993).

Saito et al., "Extrusion of single–wall carbon nanotubes via formation of small particles condensed near an arc evaporation source," *Chemical Physics Letters*, vol. 236, pp. 419–426 (Apr. 21, 1995).

Lambert et al., "Improving conditions towards isolating single–shell carbon nanotubes," *Chemical Physics Letters*, vol. 226, pp. 364–371 (Aug. 19, 1994).

Journet et al., "Large–scale production of single–walled carbon nanotubes," *Nature*, vol. 388, pp. 756–758 (Aug. 21, 1997).

Thess et al., "Crystalline Ropes of Metallic Carbon Nanotubes," *Science*, vol. 273, pp. 483–487 (Jul. 26, 1996).

Guo et al., "Catalytic growth of single–walled nanotubes by laser vaporization" *Chemical Physics Letters*, vol. 243, pp. 49–54 (Sep. 8, 1995).

Wildöer et al., "Electronic structure of atomically resolved carbon nanotubes," *Nature*, vol. 391, pp. 59–62 (Jan. 1, 1998).

Odom et al., "Atomic structure and electronic properties of single–walled carbon nanotubes," *Nature*, vol. 391, pp. 62–64 (Jan. 1, 1998).

Dresselhaus et al., *Science of Fullerenes and Carbon Nanotubes*, Academic Press, San Diego, pp. 763–764 (1996).

Endo, "Grow carbon fibers in the vapor phase," *Chemtech*, pp. 568–576 (1988).

Tibbetts, "Vapor–Grown Carbon Fibers: Status and Prospects," *Carbon*, vol. 27, No. 5, pp. 745–747 (1989).

Sen et al., "Carbon nanotubes by the metallocene route," *Chemical Physics Letters*, vol. 267, pp. 276–280 (Mar. 21, 1997).

Dresselhaus, "Carbon Nanotubes," *Journal of Materials Research*, vol. 13, No. 9, pp. 2355–2356 (Sep. 1998).

Hernadi et al., "Fe–Catalyzed Carbon Nanotube Formation," *Carbon*, vol. 34, No. 10, pp. 1249–1257 (1996).

Colomer et al., "Large–scale synthesis of single–wall carbon nanotubes by catalytic chemical vapor deposition (CCVD) method," *Chemical Physics Letters*, vol. 317, pp. 83–89 (Jan. 28, 2000).

Su et al., "A scalable CVD method for the synthesis of single–walled carbon nanotubes with high catalyst productivity," *Chemical Physics Letters*, vol. 322, pp. 321–326 (May 26, 2000).

Kitiyanan et al., "Controlled production of single–wall carbon nanotubes by catalytic decomposition of CO in bimetallic Co–Mo catalysts," *Chemical Physics Letters*, vol. 317, pp. 497–503 (Feb. 4, 2000).

Cassell et al., "Large Scale CVD Synthesis of Single–Walled Carbon Nanotubes," *J. Phys. Chem. B.*, vol. 103, pp. 6484–6492 (1999).

Flahaut et al., "Synthesis of single–walled carbon nanotubes using binary (Fe, Co, Ni) alloy nanoparticles prepared in situ by the reduction of oxide solid solutions," *Chemical Physics Letters*, vol. 300, pp. 236–242 (Jan. 29, 1999).

Brotons et al., "Catalytic influence of bimetallic phases for the synthesis of single–walled carbon nanotubes," *Journal of Moleular Catalysis A: Chemical*, vol. 116, pp. 397–403 (1997).

Fonseca et al., "Synthesis of single– and multi–wall carbon nanotubes over supported catalysts," *Applied Physics A*, vol. 67, pp. 11–22 (1998).

Yudasaka et al., "Specific conditions for Ni catalyzed carbon nanotube growth by chemical vapor deposition," *Applied Physics Letters*, vol. 67, No. 17, pp. 2477–2479 (Oct. 23, 1995).

Hernadi et al., "Catalytic synthesis of carbon nanotubes using zeolite support," *Zeolites*, vol. 17, pp. 416–423 (1996).

Cheng et al., "Bulk morphlogy and diameter distribution of single–walled carbon nanotubes synthesized by catalytic decomposition of hydrocarbons," *Chemical Physics Letters*, vol. 289, pp. 602–610 (Jun. 19, 1998).

Govindaraj et al., "Carbon Structures Obtained by the Disproportionation of Carbon Monoxide Over Nickel Catalyst," *Materials Research Bulletin*, vol. 33, No. 4, pp. 663–667 (1998).

Chen et al., "Growth of Carbon Nanotubes by Catalytic Decomposition of $CH_4$ or CO on a Ni–MgO Catalyst," *Carbon*, vol. 35, No. 10–11, pp. 1495–1501 (1997).

Hatta et al., "Very long graphitic nano–tubules synthesized by plasma–decomposition of benzene," *Chemical Physics Letters*, vol. 217, No. 4, pp. 398–402 (Jan. 21, 1994).

Hornyak et al., "Template Synthesis of Carbon Nanotubes," *NanoStructured Materials*, vol. 12, pp. 83–88 (1999).

Flahaut et al., "Synthesis of single–walled carbon nanotube–Co–MgO composite powders and extraction of the nanotubes," *Journal of Materials Communications, Chemistry*, vol. 10, pp. 249–252 (2000).

Nikolaev et al., "Gas–phase of catalytic growth of single–walled carbon nanotubes from carbon monoxide," *Chemical Physics Letters*, vol. 313, pp. 91–97 (Nov. 5, 1999).

Kiang et al., "Carbon Nanotubes with Single–Layer Walls," *Carbon*, vol. 33, No. 7, pp. 903–914 (1995).

Cassell et al., "Combinatorial Optimization of Heterogeneous Catalysts Used in the Growth of Carbon Nanotubes," *Langmuir*, vol. 17, pp. 260–264 (2001).

Li et al., "Preparation of Monodispersed Fe–Mo Nanoparticles as the Catalyst for CVD Synthesis of Carbon Nanotubes," *Chemical Materials*, vol. 13, pp. 1008–1014 (2001).

Tibbetts, "Vapor–Grown Carbon Fibers," *Carbon Fibers Filaments and Composites*, Kluwer Academic Publishers pp. 73–94 (1990).

Murayama et al., "A novel form of filamentous graphite," *Nature*, vol. 345, No. 6278, pp. 791–793 (Jun. 28, 1990).

Tibbetts, "Growing Carbon Fibers with a Linearly Increasing Temperature Sweep: Experiments and Modeling," *Carbon*, vol. 30, No. 3, pp. 399–406 (1992).

Iijima, "Helical microtubules of graphitic carbon," *Nature*, vol. 354, No. 6348, pp. 56–58 (Nov. 7, 1991).

Endo et al., "Electrical properties of Fullerene film and fiber constructs," *18th Annual Meeting of the Japanese Carbon Society*, 10 pages (Dec. 4–6, 1991).

Endo et al., "Generation and Structure of Bucky Fibers and Application in Carbon Fiber Formation," *Transactions of the $2^{nd}$ $C_{60}$ Symposium in Japan*, 17 pages (Jan. 29, 1992).

Iijima et al., "Pentagons, heptagons and negative curvature in graphite microtubule growth," *Nature*, vol. 356, No. 6372, pp. 776–778 (Apr. 30, 1992).

Tibbetts et al., "A New Reactor for Growing Carbon Fibers from Liquid– and Vapor–Phase Hydrocarbons," *Carbon*, vol. 31, No. 5, pp. 809–814 (1993).

Endo et al., "Vapor Phase Growth of Carbon Nanotube," *19th Meeting of Japanese Carbon Society*, 7 pages (Dec. 2–4, 1992).

Endo et al., "Growth Mechanisms and Structure of Carbon Nanotube," *Transactions of the 4th $C_{60}$ Symposium in Japan*, 4 pages (Jan. 26–27, 1993).

Tibbetts et al., "Physical Properties of Vapor–Grown Carbon Fibers," *Carbon*, vol. 31, No. 7, pp. 1039–1047 (1993).

Endo et al., "The Production and Structure of Polyrolytic Carbon Nanotubes (PCNTs)," *J. Phys. Chem. Solids*, vol. 54, No. 12, pp. 1841–1848 (1993).

Jiao et al., "Preparing Carbon Clusters by Catalytic Disproportionation of Carbon Monoxide," *Recent Advances in the Chemistry and Physics of Fullerenes and Related Materials, Electrochemical Society Proceedings*, vol. 95–10, pp. 667–677 (1995).

Qin, "CVD synthesis of carbon nanotubes," *Journal of Materials Science Letters*, vol. 16, No. 6, pp. 457–459 (Mar. 15, 1997).

Sen et al., "Metal–Filled and Hollow Carbon Nanotubes Obtained by the Decomposition of Metal–Containing Free Precursor Molecules," *Chemistry of Materials*, vol. 9, No. 10, pp. 2078–2081 (1997).

Terrones et al., "Controlled production of aligned–nanotube bundles," *Nature*, vol. 388, pp. 52–55 (Jul. 3, 1997).

Bronikowski et al., "Gas–phase production of carbon single– walled nanotubes from monoxide via the HiPco process: A parametric study," *Journal of Vacuum Science & Technology A*, Second Series, vol. 19, No. 4, Part II (Jul./Aug. 2001).

GAS-PHASE NUCLEATION AND GROWTH OF SINGLE-WALL CARBON NANOTUBES FROM HIGH PRESSURE CO

This application is a 371 of PCT/US99/25702 filed Nov. 3, 1999 which claims benefit of No. 60/106,917 filed Nov. 3, 1998 and claims benefit of No. 60/114,588 filed Dec. 31, 1998 and claims benefit of No. 60/117,287 filed Jan. 26, 1999 and claims benefit of No. 60/161,728 filed Oct. 27, 1999.

BACKGROUND OF THE INVENTION

1. Field of the Invention

This invention relates generally to the production of single-wall nanotubes; in particular, to gas-phase nucleation and growth of single-wall carbon nanotubes from high pressure CO.

2. Description of Related Art

Fullerenes are closed-cage molecules composed entirely of $sp^2$-hybridized carbons, arranged in hexagons and pentagons. Fullerenes (e.g., $C_{60}$) were first identified as closed spheroidal cages produced by condensation from vaporized carbon.

Fullerene tubes are produced in carbon deposits on the cathode in carbon arc methods of producing spheroidal fullerenes from vaporized carbon. Ebbesen et al. (Ebbesen I), "Large-Scale Synthesis Nanotubes," *Nature,* Vol. 358, p. 220 (Jul. 16, 1992) and Ebbesen et al., (Ebbesen II), "Carbon Nanotubes," *Annual Review of Materials Science,* Vol. 24, p. 235 (1994). Such tubes are referred to herein as carbon nanotubes. Many of the carbon nanotubes made by these processes were multi-wall nanotubes, i.e., the carbon nanotubes resembled concentric cylinders. Carbon nanotubes having up to seven walls have been described in the prior art. Ebbesen II; Iijima et al., "Helical Microtubules Of Graphitic Carbon," *Nature,* Vol. 354, p. 56 (Nov. 7, 1991).

Single-wall carbon nanotubes have been made in a DC arc discharge apparatus of the type used in fullerene production by simultaneously evaporating carbon and a small percentage of Group VIII transition metal from the anode of the arc discharge apparatus. See Iijima et al., "Single-Shell Carbon Nanotubes of 1 nm Diameter," *Nature,* Vol. 363, p. 603 (1993); Bethune et al., "Cobalt Catalyzed Growth of Carbon Nanotubes with Single Atomic Layer Walls," *Nature,* Vol. 363, p. 605 (1993); Ajayan et al., "Growth Morphologies During Cobalt Catalyzed Single-Shell Carbon Nanotube Synthesis," *Chem. Phys. Lett.,* Vol. 215, p. 509 (1993); Zhou et al., "Single-Walled Carbon Nanotubes Growing Radially From $YC^2$ Particles," *Appl. Phys. Lett.,* Vol. 65, p. 1593 (1994); Seraphin et al., "Single-Walled Tubes and Encapsulation of Nanocrystals Into Carbon Clusters," *Electrochem. Soc.,* Vol. 142, p. 290 (1995); Saito et al., "Carbon Nanocapsules Encaging Metals and Carbides," *J. Phys. Chem. Solids,* Vol. 54, p. 1849 (1993); Saito et al., "Extrusion of Single-Wall Carbon Nanotubes Via Formation of Small Particles Condensed Near an Evaporation Source," *Chem. Phys. Lett.,* Vol. 236, p. 419 (1995). It is also known that the use of mixtures of such transition metals can significantly enhance the yield of single-wall carbon nanotubes in the arc discharge apparatus. See Lambert et al., "Improving Conditions Toward Isolating Single-Shell Carbon Nanotubes," *Chem. Phys. Lett.,* Vol. 226, p. 364 (1994). High quality single-wall carbon nanotubes have also been generated by arc evaporation of a graphite rod doped with Y and Ni. See C. Journet et al., *Nature* 388 (1997) 756, hereby incorporated by reference in its entirety. These techniques allow production of only gram quantities of single-wall carbon nanotubes at low yield of nanotubes and the tubes exhibit significant variations in structure and size between individual tubes in the mixture.

An improved method of producing single-wall nanotubes is described in U.S. patent application Ser. No. 08/687,665, entitled "Ropes of Single-Walled Carbon Nanotubes" incorporated herein by reference in its entirety. This method uses, inter alia, laser vaporization of a graphite substrate doped with transition metal atoms, preferably nickel, cobalt, or a mixture thereof, to produce single-wall carbon nanotubes in yields of at least 50% of the condensed carbon. See A. Thess et al., *Science* 273 (1996) 483; T. Guo. P. Nikolaev, A. Thess, D. T. Colbert, R. E. Smalley, *Chem. Phys. Lett.,* 243, 49–54 (1995), both incorporated herein by reference. The single-wall nanotubes produced by this method tend to be formed in clusters, termed "ropes," of 10 to 1000 single-wall carbon nanotubes in parallel alignment, held together by van der Waals forces in a closely packed triangular lattice. Nanotubes produced by this method vary in structure, although one structure tends to predominate. These high quality samples have for the first time enabled experimental confirmation of the structurally dependent properties predicted for carbon nanotubes. See J. W. G. Wildoer, L. C. Venema, A. G. Rinzler, R. E. Smalley, C. Dekker, *Nature,* 391 (1998) 59; T. W. Odom, J. L. Huang, P. Kim, C. M. Lieber, *Nature,* 391 (1998) 62. Although the laser vaporization process produces improved single-wall nanotube preparations, the product is still heterogeneous, and the nanotubes are too tangled for many potential uses of these materials. In addition, the vaporization of carbon is a high energy process and is inherently costly.

Another known way to synthesize nanotubes is by catalytic decomposition of a carbon-containing gas by nanometer-scale metal particles supported on a substrate. The carbon feedstock molecules decompose on the particle surface, and the resulting carbon atoms then diffuse through the particle and precipitate as a part of nanotube from one side of the particle. This procedure typically produces imperfect multi-walled nanotubes in high yield. See C. E. Snyder et al., Int. Pat. WO 9/07163 (1989), hereby incorporated by reference in its entirety.

Yet another method for production of single-wall carbon nanotubes involves the disproportionation of CO to form single-wall carbon nanotubes +$CO_2$ on alumina-supported transition metal particles such as Mo, Mo/Fe, and Ni/Co. See Dai, H. J. et al., "Single-Wall Nanotubes Produced by Metal-Catalyzed Disproportionation of Carbon Monoxide," *Chem. Phys. Lett.,* 1996. 260(3–4): p. 471–475. In this process the transition metal particles on the alumina support that were large enough to produce multi-walled nanotubes were preferentially deactivated by formation of a graphitic overcoating, leaving the smaller metal particles to catalyze the growth of single-wall carbon nanotubes. Good quality single-wall carbon nanotubes can be grown from alumina-supported catalysts even with hydrocarbon feed stocks such as ethylene, provided the multi-walled nanotube production is suppressed by a pretreatment process. See Hafner, H. F. et al., "Catalytic Growth of Single-Wall Carbon Nanotubes From Metal Particles," *Chem. Phys. Lett.,* 1998. 296(1–2): p. 195–202; and U.S. Provisional Patent Application No. 60/101,093, entitled "Catalytic Growth of Single Wall Carbon Nanotubes from Metal Particles," and International Application No. PCT/US99/21367, hereby incorporated by reference in their entirety. These methods use cheap feed stocks in a moderate temperature process. Their yield is intrinsically limited due to rapid surrounding of the catalyst particles and the alumina particle that supports them by a dense tangle of single-wall carbon nanotubes. This tangle acts as a barrier to diffusion of the feedstock gas to the catalyst surface, inhibiting further nanotube growth. Removal of the underlying alumina support from the nanotubes that form around it will be an expensive process step.

Hollow carbon fibers that resemble multi-walled carbon nanotubes have been produced from entirely gas phase precursors for several decades. See Dresselhaus, M. S., G. Dresselhaus, and P. C. Ecklund, *Science of Fullerenes and Carbon Nanotubes*, 1996, San Diego: Academic Press, 985. Endo first used ferrocene and benzene vapors traveling through a quartz tube in an Ar+$H_2$ carrier gas at about 1000° C. to make carbon nanotubes (imperfect multi-walled carbon nanotubes) overcoated in a largely amorphous carbon. See Endo, M., "Grow carbon fibers in the vapor phase," *Chemtech*, 1988: p. 568–576. Tibbetts has used ferrocene and iron pentacarbonyl to produce similar hollow carbon fibers from methane/hydrogen mixtures at 1000° C., a process that he finds is benefited by the addition of sulfur in the form of $H_2S$. See Tibbetts, G. G., "Vapor-Grown Carbon Fibers: Status and Prospects. Carbon," 1989. 27(5): p. 745–747. In some of Endo's early experiments it is clear that small amounts of single-wall carbon nanotubes were produced as well. But until recently no means has been found to adapt these gas phase methods to produce primarily single-wall carbon nanotubes.

Very recently it has been found that control of the ferrocene/benzene partial pressures and addition of thiophene as a catalyst promoter in the all gas-phase process can produce single-wall carbon nanotubes. See Sen, R. et al., "Carbon Nanotubes By the Metallocene Route," *Chem. Phys. Lett.*, 1997 267(3–4): p. 276–280; Cheng, H. M. et al., "Large-Scale and Low-Cost Syntheses of Single-Wall Carbon Nanotubes By the Catalytic Pyrolysis of Hydrocarbons," *Appl. Phys. Lett.*, 1998. 72(25): p. 3282–3284; Dresselhaus, M. S., "Carbon Nanotubes— Introduction," *Journal of Materials Research*, 1998. 13(9): p. 2355–2356. However, all these methods involving hydrocarbon feed stocks suffer unavoidably from the simultaneous production of multi-walled carbon nanotubes, amorphous carbon, and other products of hydrocarbon pyrolysis under the high temperature growth conditions necessary to produce high quality single-wall carbon nanotubes.

Therefore, there remains a need for improved methods of producing single-wall nanotubes of greater purity and homogeneity.

SUMMARY OF THE INVENTION

The present invention provides a method and apparatus for the efficient, industrial scale production of single-wall carbon nanotubes (SWNTs) from all gaseous reactants and which product is substantially free of solid contaminants or by-products (e.g., amorphous carbon deposits). This process is based on the use of high pressure CO as the carbon source and an appropriate gaseous transition metal catalyst precursor.

The present invention provides a method for producing single wall carbon nanotube products comprising the steps of: (a) providing a high pressure CO gas stream; (b) providing a gaseous catalyst precursor stream comprising a gaseous catalyst precursor that is capable of supplying atoms of a transition metal selected from Group VI, Group VIII or mixture thereof, said gaseous catalyst precursor stream being provided at a temperature below the decomposition temperature of said catalyst precursor; (c) heating said high pressure CO gas stream to a temperature that is (i) above the decomposition temperature of said catalyst precursor and (ii) above the minimum Boudouard reaction initiation temperature, to form a heated CO gas stream; and (d) mixing said heated CO gas stream with said gaseous catalyst precursor stream in a mixing zone to rapidly heat said catalyst precursor to a temperature that is (i) above the decomposition temperature of said catalyst precursor, (ii) sufficient to promote the rapid formation of catalyst metal atom clusters and (iii) sufficient to promote the initiation and growth of single-wall nanotubes by the Boudouard reaction, to form a suspension of single wall carbon nanotube products in the resulting gaseous stream.

The present invention also provides an apparatus for producing single wall carbon nanotube products comprising: (a) a high pressure reaction vessel comprising in serial communication a reactant introduction in zone, a reactant mixing zone, a growth and annealing zone and a product recovery zone; (b) a first reactant supply conduit for supplying a heated high pressure CO gas to said introduction zone; (c) a second reactant supply conduit for supplying a gaseous catalyst precursor to said information zone; (d) mixing means for rapidly and intimately mixing the gas flows from said first and second reactant supply conduits as said flows enter said mixing zone; (e) heating means for maintaining said growth and annealing zone at an elevated temperature; and (f) gas/solids separation means positioned in said product recovery zone to remove solid single wall carbon nanotube products from the gas flows exiting said growth and annealing zone.

The present invention further provides a composition of matter comprising single-wall carbon nanotubes having a tube diameter in the range of 0.6 nm to 0.8 nm.

The present invention further provides a composition of matter comprising (5,5) single-wall carbon nanotubes.

The process involves supplying high pressure (e.g., 30 atmospheres) CO that has been preheated (e.g., to about 1000° C.) and a catalyst precursor gas (e.g., $Fe(CO)_5$) in CO that is kept below the catalyst precursor decomposition temperature to a mixing zone. In this mixing zone, the catalyst precursor is rapidly heated to a temperature that results in (1) precursor decomposition, (2) formation of active catalyst metal atom clusters of the appropriate size, and (3) favorable growth of SWNTs on the catalyst clusters. Preferably a catalyst cluster nucleation agency is employed to enable rapid reaction of the catalyst precursor gas to form many small, active catalyst particles instead of a few large, inactive ones. Such nucleation agencies can include auxiliary metal precursors that cluster more rapidly than the primary catalyst, or through provision of additional energy inputs (e.g., from a pulsed or CW laser) directed precisely at the region where cluster formation is desired. Under these conditions SWNTs nucleate and grow according to the Boudouard reaction. The SWNTs thus formed may be recovered directly or passed through a growth and annealing zone maintained at an elevated temperature (e.g., 1000° C.) in which tubes may continue to grow and coalesce into ropes.

The SWNT products can be separated from the gaseous stream and recovered. The gaseous stream, which is primarily unreacted CO can be recovered and recycled. The resulting SWNT products are substantially pure (99%) and can be used without complicated separation and purification steps. The process of this invention also provides the ability to reproducibly control the diameter of SWNT products produced. This process also provides the first SWNT process that can produce a product that is substantially made up of small diameter nanotubes (e.g., (5,5) tubes).

DETAILED DESCRIPTION OF PREFERRED EMBODIMENTS

Figure 1:
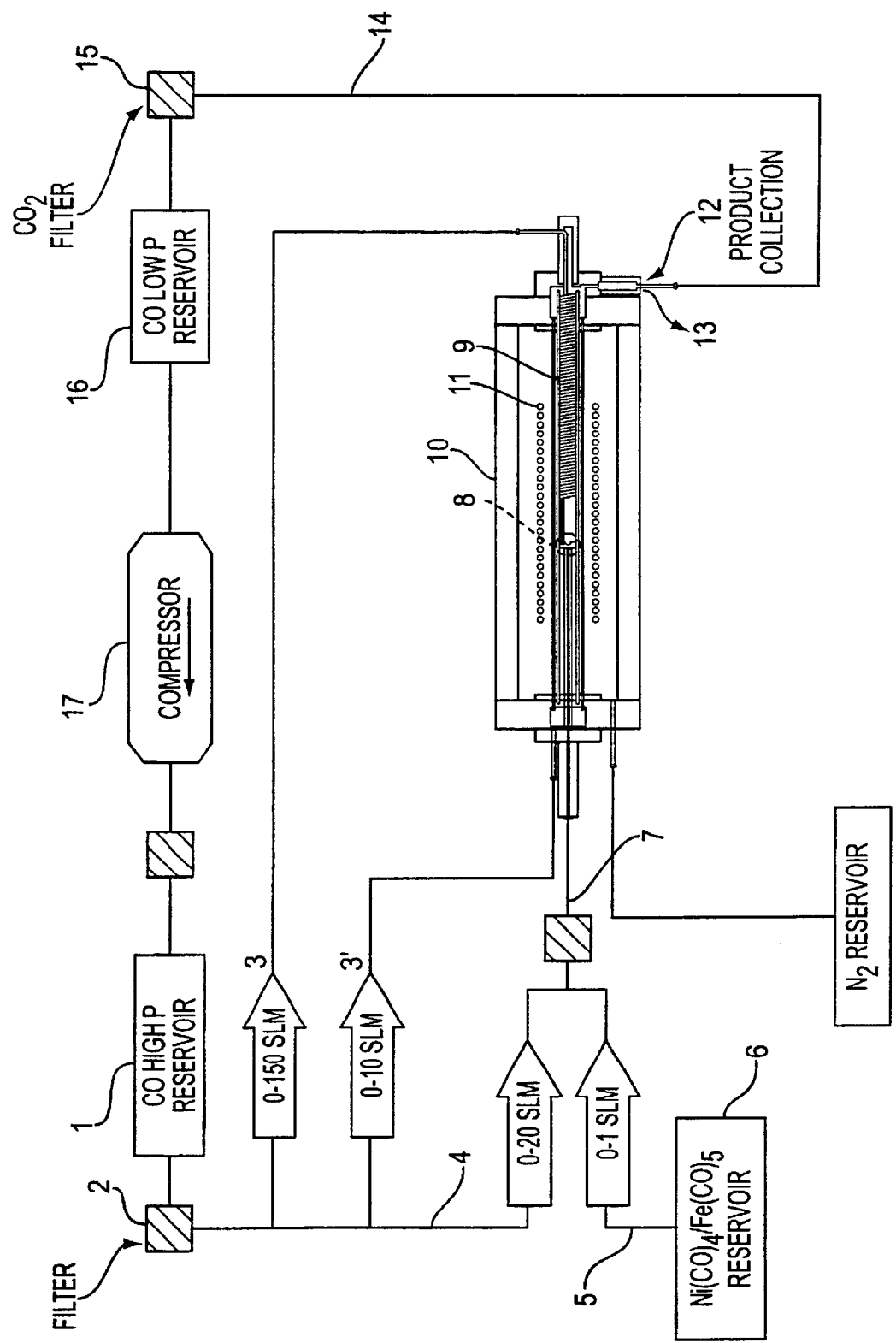
FIG. 1 is a schematic representation of one form of the process of the present invention.

Carbon has, from its very essence, not only the propensity to self-assemble from a high temperature vapor to form perfect spheroidal closed cages (of which $C_{60}$ is prototypical), but also (with the aid of a transition metal catalyst) to assemble into perfect single-wall cylindrical tubes which may be sealed perfectly at one or both ends with a semifullerene dome. These tubes, which may be thought of as one-dimensional single crystals of carbon, are true fullerene molecules.

Single-wall nanotubes are much more likely to be free of defects than multi-wall carbon nanotubes. Defects in single-wall carbon nanotubes are less likely than defects in multi-walled carbon nanotubes because the latter can survive occasional defects, while the former have no neighboring walls to compensate for defects by forming bridges between unsaturated carbon valances. Since single-wall carbon nanotubes will have fewer defects, they are stronger, more conductive, and therefore more useful than multi-wall carbon nanotubes of similar diameter.

Raw Materials

1. Carbon Source

The primary carbon source employed in the process of the present invention is carbon monoxide. CO is a readily available industrial gas that can be used with minimal pretreatment in the process of the present invention. Typically, filtration to remove unwanted particulate contaminants is all that is required. Alternatively, if desired, other purification processes such as sorption can be employed to remove unwanted gaseous contaminants in the CO feedstock. As described in more detail below, a major portion of the CO feed gas stream may result from recycling the gaseous effluent from the process.

2. Catalyst Precursor

Single-wall nanotube formation is known to be catalyzed by small metal clusters that reside at the "growing" end of the tube, and act to promote reactions in which a carbon-bearing feedstock is converted to carbon in the form of a single-wall nanotube. According to the present invention, a gaseous catalyst precursor from which the catalyst cluster forms may be a metal-containing compound that is in the gaseous state under the reaction conditions.

As described below the size of this catalyst metal atom cluster has an important influence on the nature of the product produced and in the selectivity of the process to produce SWNTs. Useful metals include the Group VI and/or Group VIII transition metals and combinations thereof. Suitable metals include tungsten, molybdenum, chromium, iron, nickel, cobalt, rhodium, ruthenium, palladium, osmium, iridium, platinum, and mixtures thereof. Generally preferred are catalyst systems based on Fe, or Co. The preferred catalyst precursor compounds are metal carbonyls (e. g., $Fe(CO)_5$, $Co(CO)_6$). Metallocene precursors such as $FeCp_2$, $CoCp_x$ can also be used.

3. Nucleating Agents

As described in greater detail below, the process of the present invention is based in part on the provision of rapid (near simultaneous) (1) formation of the active catalyst metal atom cluster of the appropriate size and (2) initiation of SWNT growth. In order to form clusters of Fe atoms from dissociated precursor molecules (e.g., Fe $(CO)_5$), the cluster must grow to the minimum nucleation size, typically 4–5 atoms. Aggregation is effected at this early stage by how tightly the COs are bound to the Fe atom in the precursor and how tightly the initially formed Fe dimer is bound. The Fe dimer binding energy is relatively low (on the order of 1 eV). Accordingly the formation of Fe atom aggregates of 4–5 atoms is a bit sluggish at the reaction temperatures (800–1000° C.). More rapid nucleation can be effected by including a nucleating agent in the gas feed stream. Such a nucleating agent can be a precursor moiety that under the reaction conditions stimulates clustering by decomposing more rapidly or binding to itself more tightly after dissociation. One such nucleating agent that has been shown to substantially improve the performance of Fe catalysts is $Ni(CO)_4$. The binding energy of the Ni dimer is on the order of 2 eV and thus Ni dimers are more likely than Fe dimers to facilitate rapid aggregation to the critical 4 or 5 atom cluster level. Fe atom clusters thus may be formed homogeneously or on seed clusters of Ni atoms. Any metal-containing precursor that facilitates this rapid nucleation can be employed. Other suitable examples include $Mo(CO)_6$ and $W(CO)_6$. In the case of the Fe/Ni system, ratios of $Fe(CO)_5$ to $Ni(CO)_4$ can range from about 10:1 to about 1:2 on an atom basis. Preferred are ratios in the range of about 3:1 to 1:1 with the most preferred ratio being about 1:1.

The use of nucleating agents can increase the productivity of the process significantly (e.g., 2–4 or more times). This increase is especially unexpected since $Ni(CO)_4$ alone has no appreciable catalytic effect in the high pressure CO process of the present invention under conditions typically employed.

Process Description

As shown in FIG. 1, one embodiment of the overall process of the present invention involves the supply of high pressure CO from a suitable source shown here as CO supply vessel 1. After optional cleanup in filtration unit 2, the high pressure CO is divided into undiluted stream 3 and catalyst carrier stream 4. An additional stream 3' may also be provided. Catalyst precursor is supplied via stream 5 from a suitable source, shown here as catalyst supply vessel 6. A catalyst-containing CO stream 7 is then formed by combining streams 4 and 5.

The gas phase process of the present invention operates at high (i.e., superatmospheric) pressure. Since the gaseous reactants are predominantly CO, the reaction pressure parameters can be best discussed in terms of the partial pressure of CO, i.e., $P_{CO}$. In general, it is preferred to employ $P_{CO}$ in the range of from about 3 to about 1000 atm. More preferred are $P_{CO}$ values in the range of about 5 to 500 atm, with most preferred values being in the range of 10 to 100 atm. In general, higher $P_{CO}$ values in these ranges are preferred. As the $P_{CO}$ of the reaction is increased, at least three benefits are achieved. Firstly, the partial pressure of catalyst precursor $P_{cat}$ can be increased as the $P_{CO}$ is increased resulting in more catalyst clusters and better productivity. Secondly, the Boudouard reaction is faster at higher pressures and this facilitates the rapid growth of SWNTs. Finally, at higher $P_{CO}$ values the catalyst precursor (e.g., $Fe(CO)_5$) decomposition temperature becomes closer to the optimum nanotube growth temperatures, thus facilitating faster cluster growth and the desired relatively simultaneous cluster formation and growth reactions.

The concentration of catalyst precursor in the total CO gas feed should be in the range of from about 1 to 100 ppm, and preferably about 5 to 50 ppm. Typical concentrations in the range of 10–30 ppm may be employed in a most preferred embodiment of the process. It is convenient to refer to the catalyst precursor feed concentration in terms of its partial pressure, Peat This value can in general range from about 250 mTorr up to 100 Torr. As described above, higher $P_{cat}$ values can advantageously be employed as $P_{CO}$ is increased. Preferred $P_{cat}$ ranges are from 0.5 Torr to 50 Torr, with more preferred values ranging from about 1 to 10 Torr.

While flow rate necessary to achieve the partial pressures described above will vary with the particular design and scale of the apparatus employed, typical flow rates for the apparatus schematically shown in FIG. 1 are on the order of 1 slm of catalyst precursor stream 5, 0–20 slm for CO dilutions stream 4 and 0–150 slm for undiluted CO stream 3.

Catalyst-containing stream 7 and undiluted CO stream 3 are forwarded to a mixing zone 8. Although not shown in this figure and as described in more detail below, stream 3 should be preheated prior to or in combination with its introduction into the mixing zone. Any suitable means normally employed to preheat gas streams may be employed.

The preheating of undiluted CO stream 3 generally should be sufficient to result in a reaction mixture, after combining with catalyst precursor/CO stream 7, that is rapidly and uniformly heated to a temperature that favors near simultaneous catalyst cluster formation and SWNT growth via the Boudouard reaction. This reaction temperature should be in the range of about 850° C. to 1250° C. Accordingly, CO stream 3 generally is heated to the range of from about 850° C. to 1500° C. Preferably this preheating step results in a CO stream 3 temperature in the range of about 900–1100° C. with the most preferred temperature being about 1000° C. Stream 7 should be kept below the decomposition temperature of the catalyst precursor. This can be accomplished, if necessary, by using known cooling methods such as air or water cooling. Preferably the catalyst/CO stream 7 is kept at a temperature below 200° C., and preferably is maintained at a temperature in the range of from about 70° C. to 200° C. If the temperature exceeds the catalyst decomposition temperature, clusters may form too early in the process and become inactivated before they can participate in the SWNT growth process. Of course, the temperature range may vary depending on the precise catalyst or catalyst mixture employed.

Streams 3 and 7 are then combined in mixing zone 8 where nucleation and growth of SWNTs take place. The mixing zone 8 should be configured to provide rapid mixing of preheated CO stream with catalyst precursor containing stream 7. As this mixing takes place, the catalyst precursor stream is rapidly heated to a temperature in the range of from about 900–1000° C. in one preferred embodiment. Extremely short mixing times are desired and can be referred to as nearly simultaneous. These mixing times should preferably be below about 1 msec and preferably on the order of 1 to 100 $\mu$sec. The object of this fast mixing is the fast and uniform heating of the catalyst precursor. Accordingly, turbulent mixing conditions are preferred since heat transfer is promoted thereby. As a result of these rapid mixing conditions, the volume of the mixing zone will not be large. Typically, complete mixing/heating is accomplished in a volume on the order of 1 cm or less. Flow rates to the mixing zone can be controlled for a given mixing zone configuration to provide the requisite turbulence and are typically subsonic although supersonic mixing may be employed.

The mixture of SWNTs freely suspended in gas leaving the mixing zone enters growth and annealing zone 9. This zone is preferably kept at an elevated temperature by enclosing it in an oven 10, containing heating elements 11 of any suitable kind. The oven 10 is preferably maintained at a temperature of from about 850° C. to 1250° C. and more preferably is maintained at a temperature of about 1000° C. The oven 10 is preferably supplied with a pressure equalizing gas, e.g., $N_2$ from supply vessel 12. This gas should equal or slightly exceed the operating pressure in the system. In the growth and annealing zone, additional growth of previously formed SWNTs may take place, as may the formation of new tubes. In this zone, the formed tubes may also aggregate and remain bound to one another by van der Waals forces to form ropes (i.e., up to about $10^3$ or more tubes in generally parallel alignment).

After leaving growth and annealing zones, the mixture of gas (primarily unreacted CO and $CO_2$) containing suspended SWNT products (mostly ropes) is forwarded to a product recovery zone 12. In the product recovery zone, the solid product 13 is removed from the gas stream by any suitable means and the separated gas stream 14 can be recycled. Product separation can be accomplished by any known gas/solids separation means including filtration or the like. To facilitate continuous operation, an endless belt or drum-type filter carrier can be employed in a known manner.

Recycle gas stream 14 can be forwarded to supply vessel 1. Preferred intermediate steps can include $CO_2$ removal at 15 and storage in low-pressure supply vessel 16. The low pressure CO can be recompressed with any suitable means shown at 17 and then forwarded to high-pressure storage vessel 1.

SWNT Diameter Control

One important aspect of the process of the present invention is the ability to control the tube diameter of the SWNTs produced. Generally, the diameter of the growing nanotube is proportional to the size of its active catalyst cluster at the time the tube starts to grow. The factors that control tube diameter include the rate of aggregation of metal particles to form catalyst clusters and the rate at which nanotube growth begins upon a cluster of given size. The relationship of these two rates can be controlled in three ways that can be used separately or together as desired. The first control mechanism involves the ratio of $P_{CO}$ to $P_{cat}$. Larger $P_{CO}/P_{cat}$ ratios result in smaller catalyst metal atom clusters which provide smaller diameter tubes. Conversely lower $P_{CO}/P_{cat}$ ratios result in rapid formation of larger metal clusters which produce larger diameter tubes. Even for a constant value of $P_{CO}/P_{cat}$, higher absolute values of $P_{CO}$ result in formation of smaller tubes, because the initiation of tube growth takes place more effectively at higher pressures of CO. Stated another way, at a fixed temperature and metal concentration, a lower carbon monoxide pressure causes the tube growth initiation process to proceed more slowly, allowing the catalyst particle to become larger before the tube growth is initiated. These larger catalyst particles spawn larger tubes. Similarly, an increase in the metal concentration will allow cluster formation to be more rapid, also resulting in the production of larger tubes. The minimum size (5,5) tubes are preferably formed under conditions where the tube growth initiation is rapid relative to the catalyst cluster growth. By use of these control mechanisms, SWNT tube diameter from (5,5) to about (10,10) can be produced.

The third control mechanism, which involves addition of a nucleation agent, such as $Ni(CO)_4$, which accelerates the aggregation rate of catalyst clusters, will also result in an increase in the diameter of the tubes produced. In addition, the tube diameter can be controlled by varying the temperature in the mixing zone. In general, higher temperatures result in smaller tubes.

The Chemical Process

The interaction of the catalyst precursor with the carbon monoxide initiates the formation of metal clusters via gas-phase reactions in the presence of carbon monoxide. These interactions may involve thermal energy transfer that induces dissociative processes in a molecular precursor, interaction of the carbon monoxide with dissociation fragments of a precursor molecule, attachment of one or more carbon monoxide molecules to a precursor molecule fragment or to a metal atom that serves as a precursor, and/or participation of the carbon monoxide in processes by which the metal catalyst particle aggregates. In the process of the present invention, metal catalyst particles grow by aggregation in the gas phase.

At relatively high carbon monoxide pressure and a suitable temperature, tube growth begins on catalyst particles after they reach the minimum size required to support tube formation. The tube growth proceeds by the Boudouard reaction $(CO+CO \rightarrow C(SWNT)+CO_2)$ on these $Fe_x$ catalyst particles, forming a single-wall carbon nanotube on each particle, the single-wall carbon nanotube continuing to grow with the particle at its "live end." The high pressure of CO and 800–1000° C. temperature insure that this reaction is fast and that defects in the single-wall carbon nanotube are annealed away as it is formed. The high pressure of CO is necessary to (1) insure that every $Fe_x$ starts a single-wall carbon nanotube before the $Fe_x$ particle has grown too large by addition of Fe atoms or larger Fe clusters, and (2) to drive the equilibrium toward the single-wall carbon nanotube $+CO_2$ products even in the presence of substantial $CO_2$ partial pressures that develop as the reaction proceeds. In this regard the new method for single-wall carbon nanotube production disclosed here resembles the Haber-Bosch process for the syntheses of ammonia $(N_2+3H_2 \rightarrow NH_3)$ over an activated iron catalyst.

The formation of metal atom catalyst clusters must take place rapidly and at the place and time at which conditions are optimum for initiation of the Boudouard reaction. Cluster size when the growth reaction begins dictates the diameter of the nanotube. In the present invention, the smallest tubes produced have diameters of about 0.6 nm. There are reaction conditions under which this tube diameter is more likely to be produced than other tube diameter. The 0.6 nm dimension is the diameter of the (5,5) nanotube, which is the same as the diameter of the $C_{60}$ molecule To prevent cluster overgrowth and reaction termination; all the precursor molecules should be dissociated and used to make clusters nearly simultaneously (i.e., over very short periods of time). If large amounts of catalyst precursor species remain in the environment with active clusters supporting nanotube growth, these precursor species will aggregate on the active clusters, enlarging them. As the diameter of the active cluster increases, so does the probability that it will overcoat with a carbon coating, rendering it inactive as a catalyst. Product from the process described here contains many 2–3 nm. diameter metal clusters that are overcoated with carbon, suggesting that growth to this size and overcoating are the fate of all active catalyst clusters. This catalyst deactivation mechanism is slowed if most of the catalyst precursor species rapidly dissociate and their dissociation products form active catalyst clusters.

Pyrolytic formation of amorphous carbon deposits on the growing tubes and the reaction vessels is a known problem with most methods for growing single-wall carbon nanotubes. In the present invention, the production of undesired carbon forms is minimized because the formation of free carbon from carbon monoxide is inherently a process that occurs efficiently only with the action of a catalyst. In the present process, an active catalyst is present only in the form of metal clusters on the growing ends of single-wall nanotubes.

As the key to high single-wall carbon nanotube production is to keep the $Fe_x$ particles from growing too large, one observes that the present process has an additional advantage in that the catalyst quickly grow a long single-wall carbon nanotube, and collisions between these particles (which would otherwise result in coalescence to produce a much larger particle) are eliminated because all such collisions are dominated by tube-tube encounters. These tube-tube encounters can result in the colliding, growing tubes coming into alignment in van der Waals contact. Even if the tubes aggregate with each other or with other small "ropes", the $Fe_x$ clusters at the end of each tube are then prevented from coming into frequent contact, while remaining as "live" ends of their respective single-wall carbon nanotube.

Apparatus Description

The apparatus schematically shown in FIG. 1 will now be described in more detail with reference to FIGS. 2(a) and 2(b) where like numerals refer to the previously described elements. FIG. 2(a) shows the oven 10 and the portion of the system of FIG. 1 that is associated with it. Oven 10 is a cylindrical aluminum pressure vessel containing electrical resistance heating element 11 surrounded by insulating material (not shown) in the central portion. Other materials and heating methods can, of course, be employed as is known in the art. Suspended in axial orientation in oven 10 is reactor tube 20. This reactor tube 20 includes both the mixing zone 8 and growth and annealing zone 9. In the illustrated embodiment, tube 20 is quartz and has a diameter of 7.5 cm and a length of 120 cm. Undiluted CO feed stream 3 in this embodiment enters the oven 10 near the exit and is passed countercurrently through conduit 21 at the periphery of the growth and annealing zone 9 to supply CO to the mixing zone 8, shown in more detail in FIG. 2(b). This conduit 21 is, in the illustrated embodiment, a copper coil 21 of 0.250" in O.D. spirally wound tubing. This configuration employs the heat in the quartz tube (from the oven and growth annealing zone) to preheat the CO gas stream fed to mixing zone 8. This embodiment therefore is highly thermally efficient.

Referring now to FIG. 2(b), a portion of the reactor tube 20 is shown in the vicinity of mixing zone 8. The catalyst precursor/CO stream 3 enters via stainless steel tube 22, which is water-cooled by jacket 23. Tube 22, which in the illustrated embodiment is 0.260" I.D., leads directly into axial flow nozzle 24 (also quartz), which delivers the catalyst precursor/CO feed mixture directly into mixing area 25. In the embodiment shown, nozzle 24 has a 0.260" O.D. at its upstream end and 0.075" O.D. at its downstream tip. Its orifice I.D. at the downstream tip is approximately 0.040". The countercurrent undiluted CO flow in tube 21 is connected to manifold 26, through which nozzle 24 also protrudes. Manifold 26 preferably can be formed of stainless steel, graphite or the like. In manifold 26 the CO stream is redirected tangentially to the axial flow from nozzle 24 and supplied to mixing area 25 through a plurality of radially disposed tangentially directed injectors 27. In the illustrated embodiment these injector tubes have an outlet I.D. of 1 mm, and are holes bored through the body of manifold 26. Any number of such tangentially directed injectors may be employed. At least three such injectors 27 are preferred. Any configuration of mixing area and injectors that achieve the rapid mixing described above can be employed. In the embodiment shown, the tangentially directed injectors intersect the axis of the axial injector nozzle at an angle of about 30°. Other angles may, of course, be employed.

Figure 2:
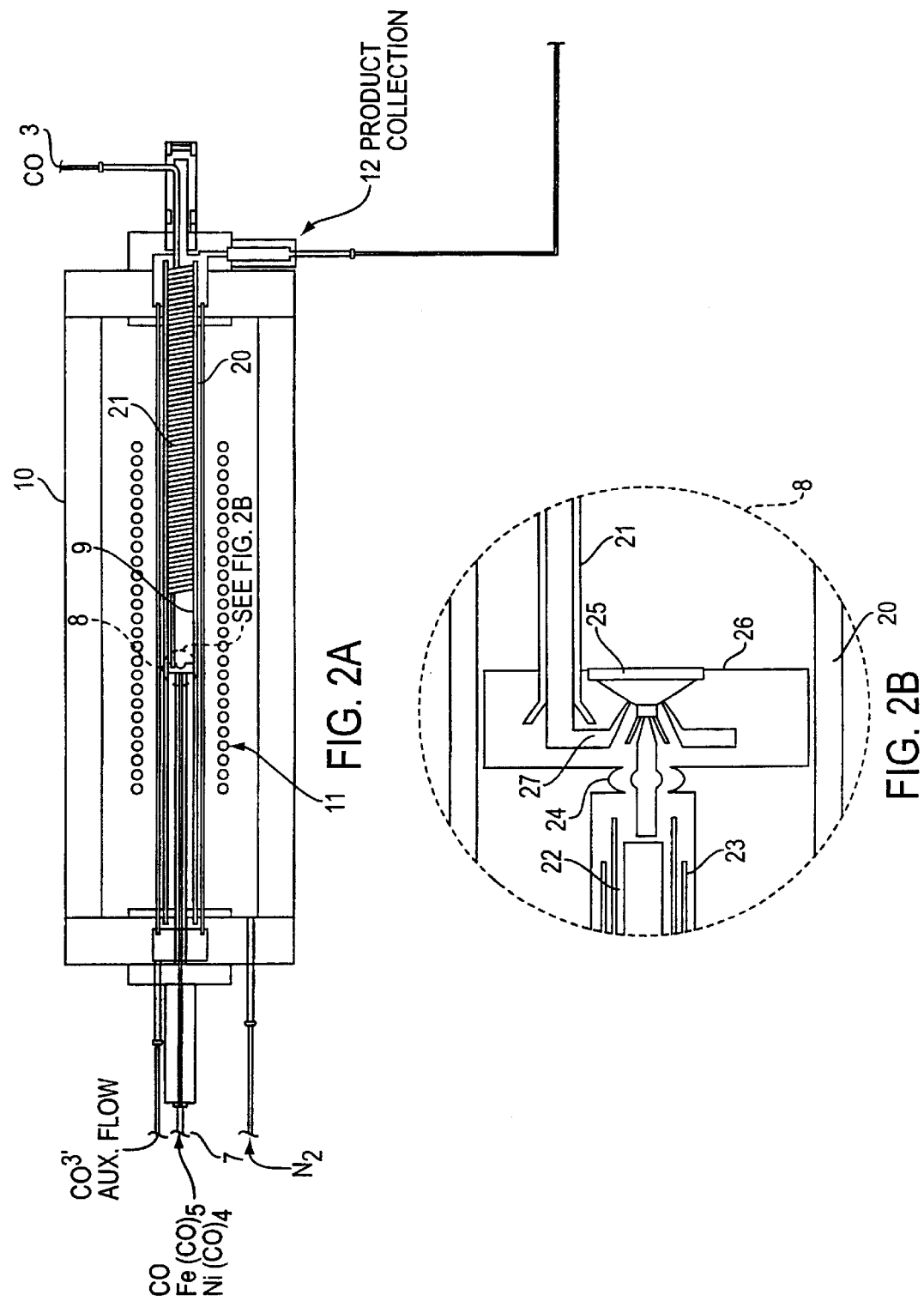
FIG. 2 shows the pressure vessel and oven within the apparatus useful to perform the process of the present invention.
Figure 3:
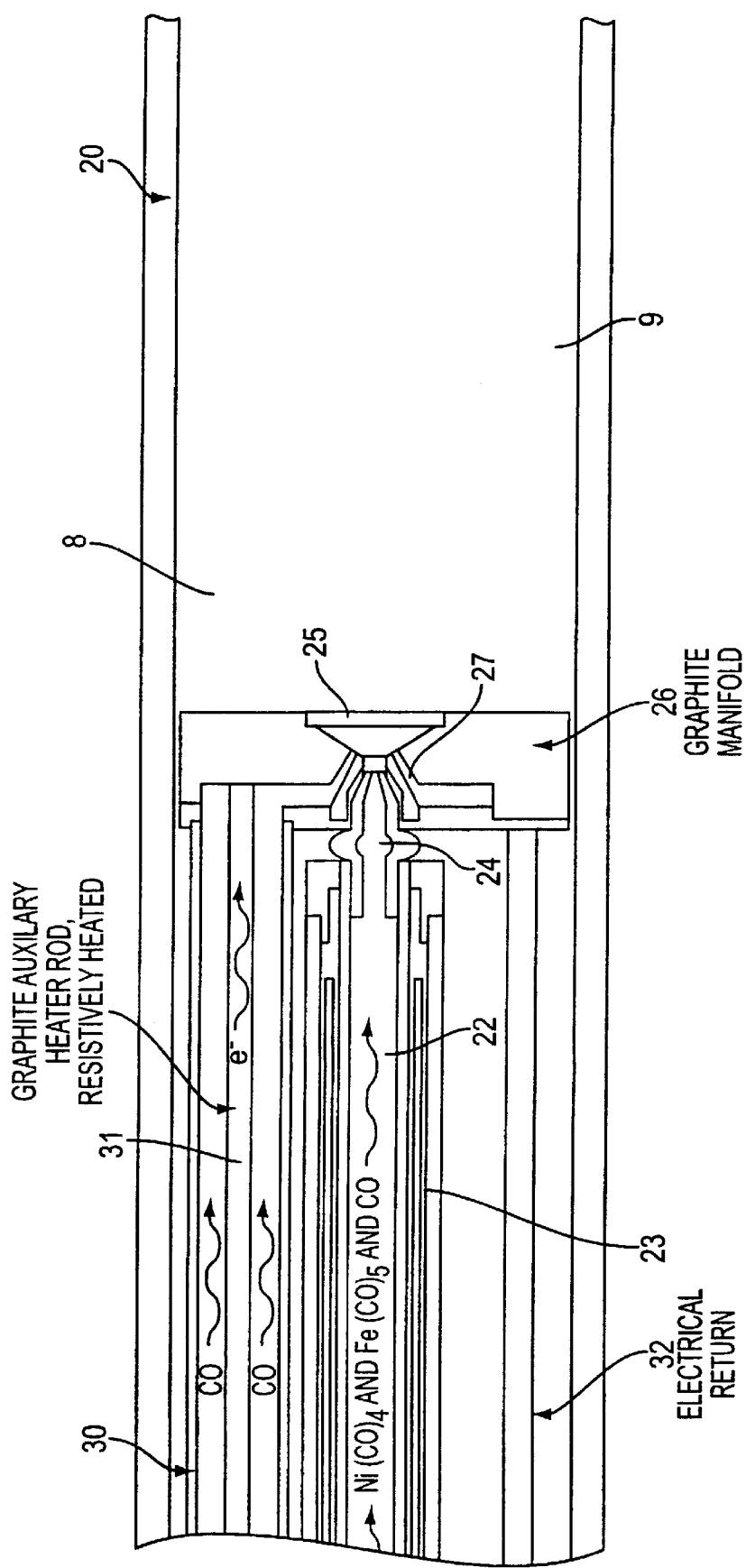
FIG. 3 shows another arrangement of the apparatus useful to perform the process of the present invention.

FIG. 3 shows an alternative embodiment of the apparatus of the present invention in which the undiluted CO feed and preheating are positioned upstream of mixing zone 8. In this embodiment, CO is fed to mixing zone 8 through feed tube 30 which, as shown, is a 12 mm O.D. quartz tube. Preheating is effectuated by a suitable resistive heating element 31, which in the illustrated embodiment is a graphite rod in electrical contact with graphite manifold 26 and a copper electrical return rod 32. Other forms of energy input for preheating the CO may be employed in known manner. This configuration operates similarly in all material respects to the embodiment of FIG. 2, except that waste heat in the growth and annealing zone 9 is not directly recovered to preheat incoming CO. Heat recovery means may be employed in the CO recycle loop if desired.

Figure 4:
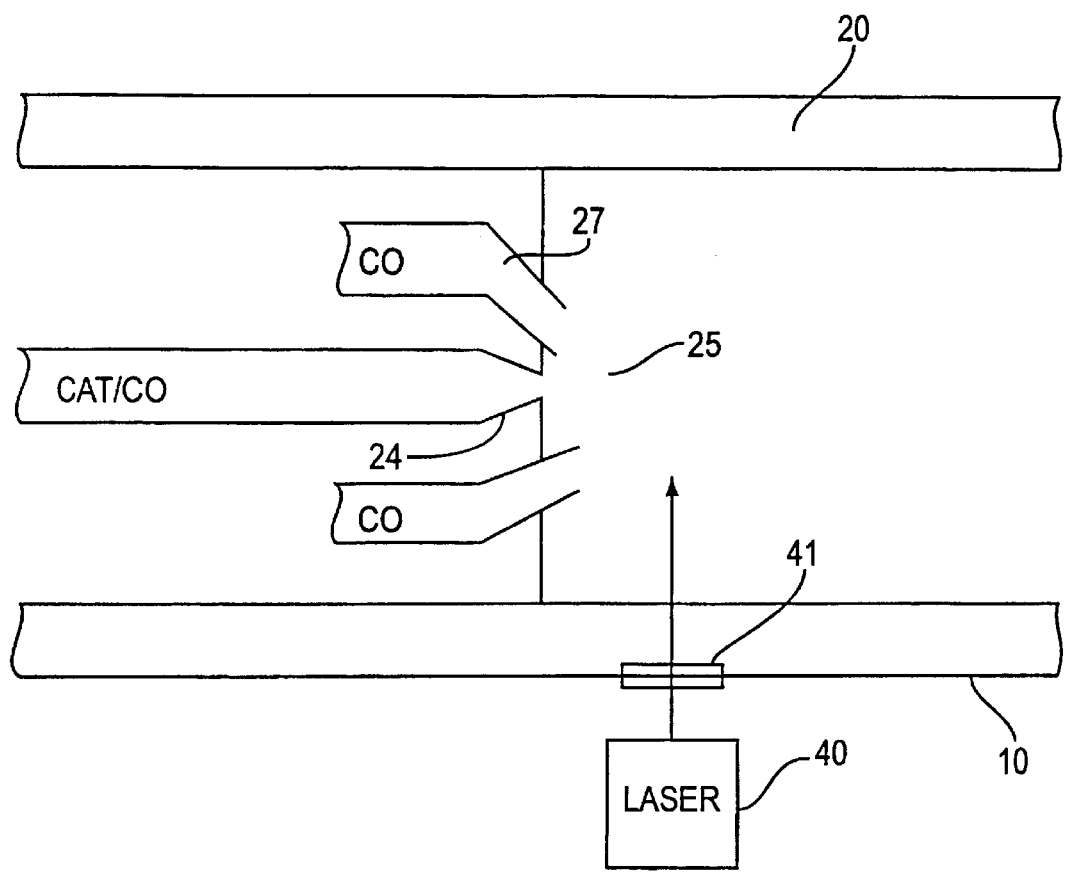
FIG. 4 shows introduction of a laser beam in the reagent mixing section of the apparatus useful to perform the process of the present invention.

FIG. 4 shows an alternative embodiment of the present invention. In this embodiment a high repetition rate pulsed laser (repetition rate >1 kHz) is employed to supply some or all of the energy needed for photolysis cluster precursors, i.e., to dissociate the catalyst precursor and form active catalyst metal atom clusters. As such, the provision of this laser input may be termed a nucleation agency. As illustrated, the output beam of a KrF laser 40 is passed through a quartz window 41 in oven 10 and focused to impinge on the gas mixture in mixing area 25. The laser operates at a repetition rate of 1000 pulses per second at a power level of 50 millijoules per pulse. As in the other embodiments, the CO feed gas is preheated to approximately 1000° C. It is also possible to employ a CW laser as the nucleation agency.

Figure 5:
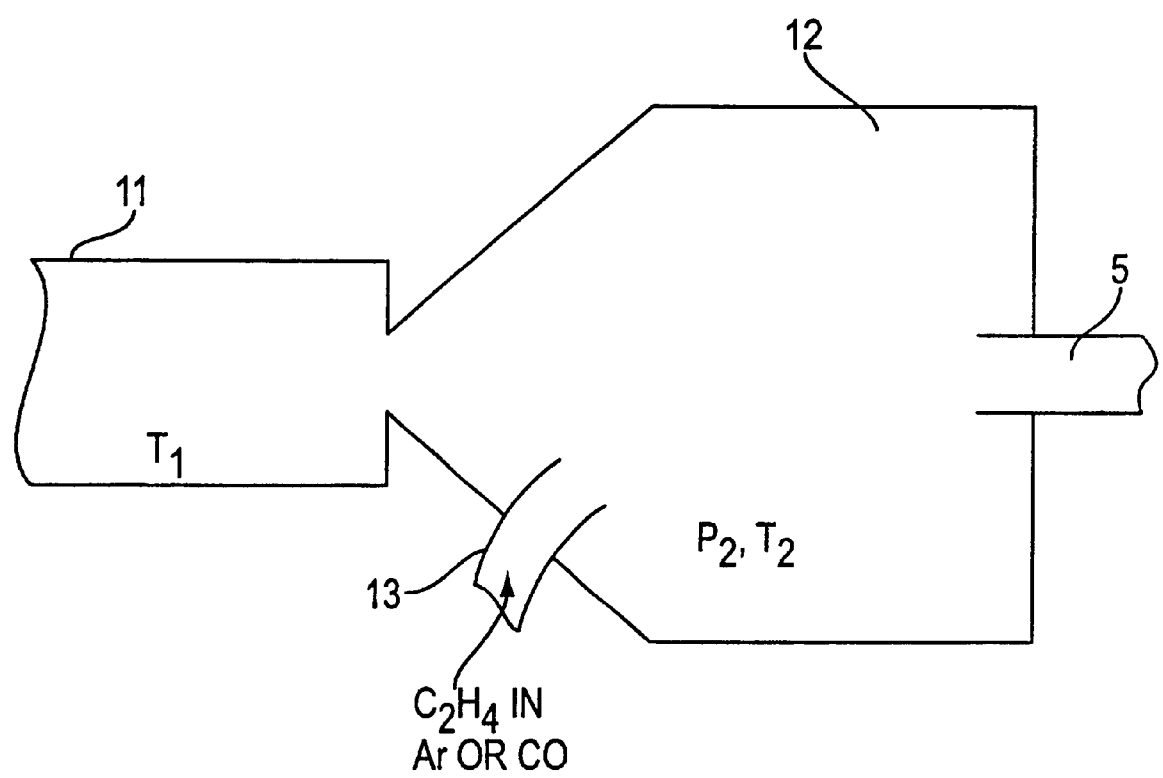
FIG. 5 is a schematic representation of an alternative process for gas-phase nucleation and growth of single-wall carbon nanotubes from high pressure CO according to another embodiment of the present invention.

In an alternate embodiment, shown in FIG. 5, the process of the present invention can be carried out in a two-part reaction zone. In reaction initiation (nucleation) zone 11, CO is contacted with a catalyst precursor under conditions that favor formation of the proper size metal cluster on the end of a growing single-wall nanotube (e.g., $P_1$>10 atmospheres, $T_1$=850° C. to 1250° C.). In reaction growth zone 12, the conditions and reactants are changed to favor growth of carbon nanotubes (e.g., introduction of $C_2H_2$ as an alternate carbon source through inlet 13, and $P_2$=1 atmosphere, $T_2$=850° C. to 1250° C.).

Figure 6:
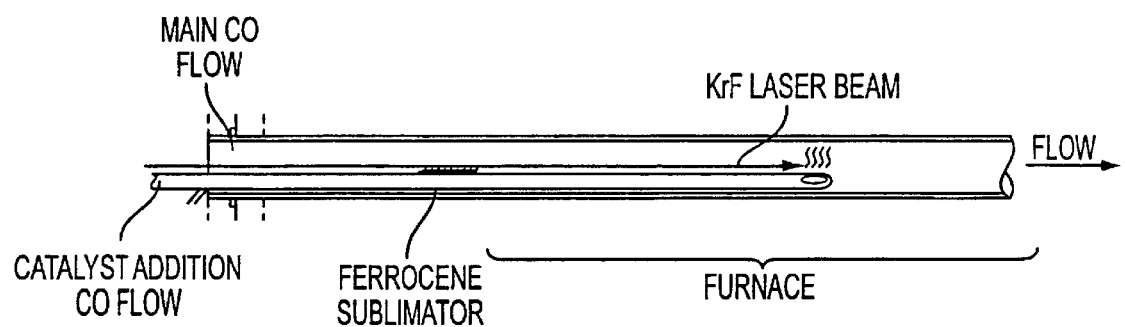
FIG. 6 is a schematic representation of an alternative process for gas-phase nucleation and growth of single-wall carbon nanotubes from high pressure CO according to another embodiment of the present invention.
Figure 7:
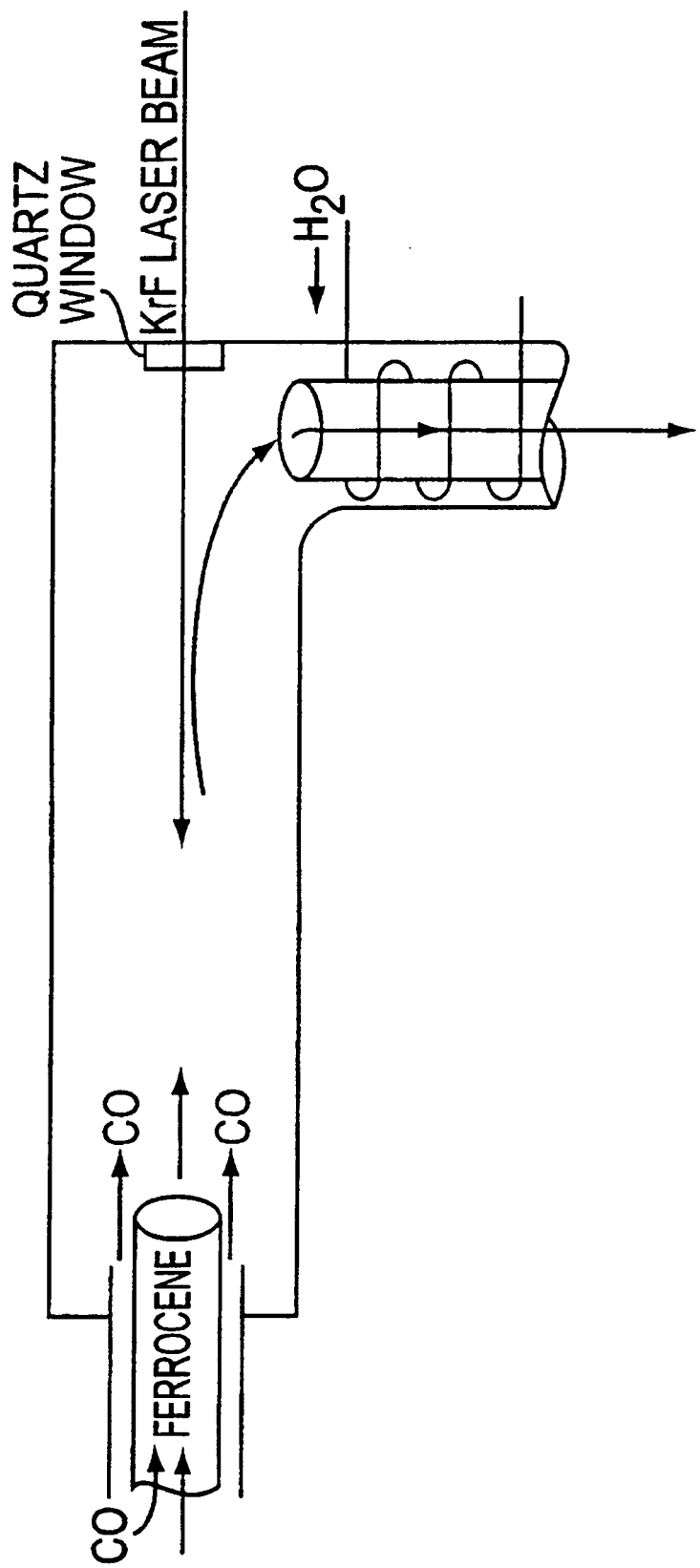
FIG. 7 is a schematic representation of an alternative process for gas-phase nucleation and growth of single-wall carbon nanotubes from high pressure CO according to another embodiment of the present invention.

Another embodiment of the present invention is shown in two variations in FIGS. 6 and 7. In its preferred form, this alternative embodiment begins with a KrF excimer laser dissociation of ferrocene ($FeCp_2$) that has been premixed in high pressure CO (10–1000 atm) and heated to a temperature of 800–1000° C. While a laser is used to initiate the catalyst formation, this laser is one that is available for routine operation on an industrial scale, and only moderate laser intensities (~100 mJ/cm$^3$ in 25 ns pulses, 10–250 pulses per second) are necessary. Although catalyst formation is stimulated by a laser, the single-wall carbon nanotubes are grown from a cheap industrial gas, CO, at moderate temperature in a continuous, easily-scaled process. The laser may be directed in the downstream direction, as shown in FIG. 6, in the upstream direction, as shown in FIG. 7, or in a crossing direction as shown in FIG. 4.

The high thermal stability of ferrocene insures that little decomposition of this gas phase molecule occurs while it is mixed with the CO and reaches the desired operating temperature. The KrF excimer laser then efficiently dissociates the ferrocene as it exits the catalyst addition tube. The 5.0 eV KrF laser photons are absorbed by the ferrocene molecules with an effective cross-section of 5×10$^{-18}$ cm$^2$, resulting (at the 800–1000° C. temperature of the reactor) in prompt dissociation to produce a FeCp. radical plus a cyclopentadienyl radical Cp.. Some of these FeCp. radicals absorb a second Kr photon and fragment further to Fe+Cp.. These laser-produced free radicals attack the remaining undissociated ferrocene in chain reactions resulting in the nucleation of Fe clusters, which in turn, also promote dissociation of the ferrocene. The choice of CO is particularly useful since not only does the high pressure provide frequent collisions which are necessary to thermalize the clustering Fe atoms and FeCp. radicals, but it also complexes with a substantial fraction of Fe (~20% for $P_{CO}$=100 atm at T=1000° C.) to produce FeCO (thereby carrying "its own third body" to take away the excess energy of binding as the Fe atoms begin to cluster). The Cp. radicals from the laser dissociation of the ferrocene react with one another and pyrolyze to produce small carbon clusters that further aid the nucleation of the $Fe_x$ catalyst particles and act as feedstock in the early stages of single-wall carbon nanotube growth. So, in spite of the great thermal stability of ferrocene, the KrF laser triggers an avalanche of dissociation and clustering events that, within a few microseconds, produces a high number density of ~1 nm diameter catalyst particles.

The method described above is not restricted to ferrocene. Other metallocenes, such as ruthenocene, cobaltocene, etc., may be used as well as the carbonyls such as $Fe(CO)_5$, $Mo(CO)_6$, etc., as well as combinations of these with each other and with other volatile organometallics. All these species have strong absorption for KrF excimer wavelengths. Alternatively, other laser wavelengths may be used to dissociate the organometallic catalyst precursor module. For example, the ArF excimer laser wavelength is strongly absorbed by ferrocene (cross-section for absorption ~10$^{-16}$ cm$^1$) and results in prompt dissociation, but the "Cameron Bands" absorption of CO at this wavelength will attenuate the ArF excimer laser beam as it propagates through the reaction oven.

Catalyst promoters, such as thiophene, $H_2S$, or volatile lead or bismuth compounds may be added to the CO as well to fine tune the activity of the catalyst and/or the diameter distribution of the single-wall carbon nanotube product.

Product Description

The product of the present invention is a composition that comprises single-wall carbon nanotubes and/or ropes of these materials (i.e., up to $10^3$ tubes generally aligned and held together by van der Walls forces). The compositions, as produced, are extremely clean and can be used directly without expensive and time-consuming purification steps. In the preferred product of this invention these compositions are substantially free of amorphous carbon and contain only minor amounts of catalyst atoms as impurities. The compositions of the present invention can contain greater than 75% of SWNTs. The preferred products according to this invention may comprise greater than 99% SWNTs. These percentages are on an atom basis.

Another important aspect of the products of the present invention is the unique tube diameter properties of these compositions. The SWNT compositions of this invention provide tube diameters that are smaller than products produced by prior art processes. In general, the tube diameters of the products of the present invention are in the range of form about 0.6 nm to about 2 nm. The preferred products of this invention have tube diameters in the range of from about 0.6 nm to about 0.8 nm. Compositions according to this invention will have greater than 50%, preferably greater than 75%, and most preferably, greater than 95%, of all SWNTs in this 0.6 nm to 0.8 nm diameter range. Moreover, by the control mechanisms that form a part of this invention, it is possible for the first time to produce products with substantial quantities of (5,5) tubes.

The 5,5 tube is one of the smallest, if not the smallest, diameter stable single-wall nanotube that can be formed, and of all (n,n) tubes, its sidewalls should be the most chemically active because they are the most strained. In general, products that comprise at least 25% (5,5) tubes and preferable those that comprise at least 50% (5,5) tubes are provided by the present invention.

Figure 8A:
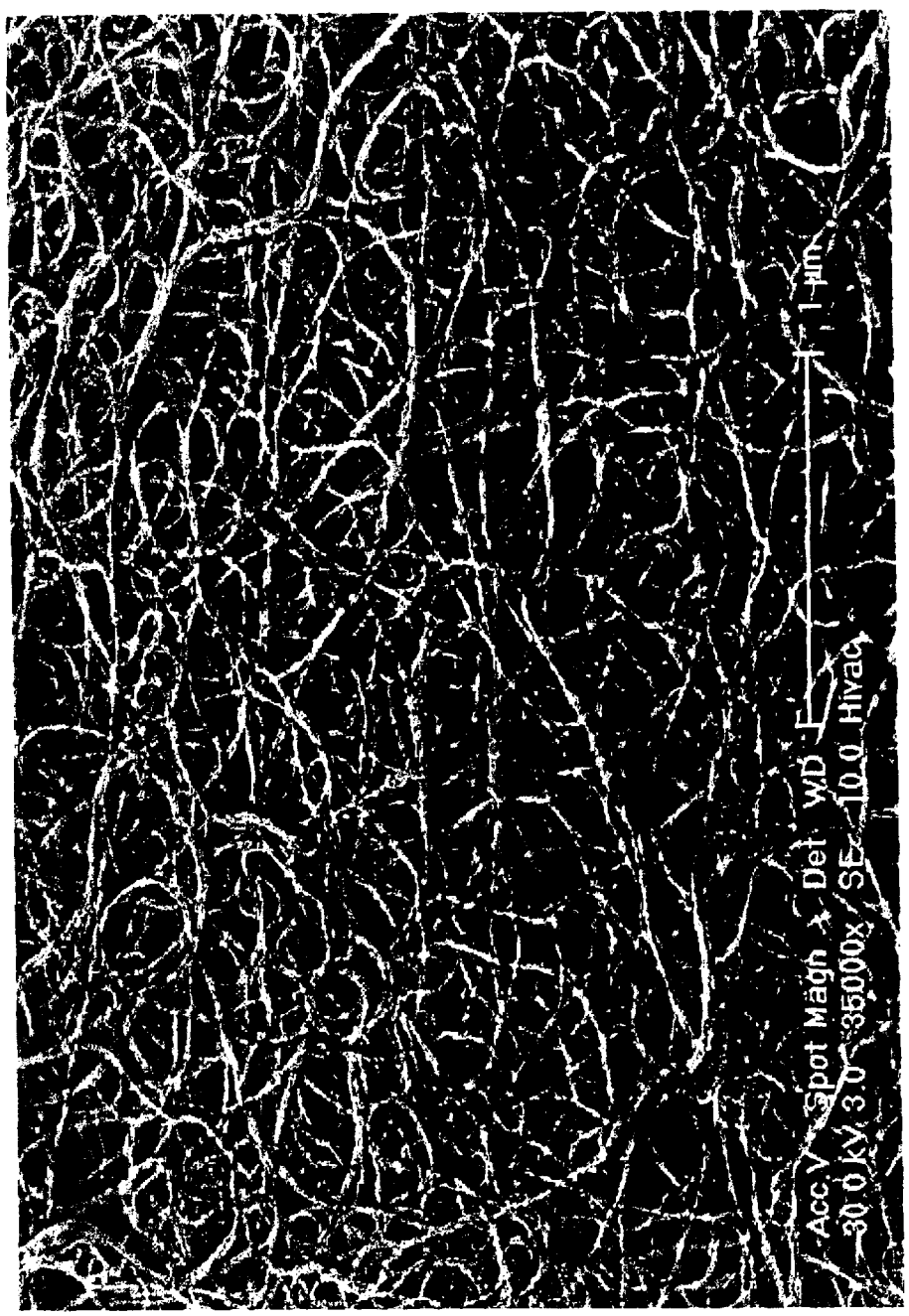
FIG. 8 is a series of photomicrographs showing the SWNT product produced according to the process of the present invention in which FIG. 8($a$) is a TEM and FIG. 8($b$) is a SEM.
Figure 8B:
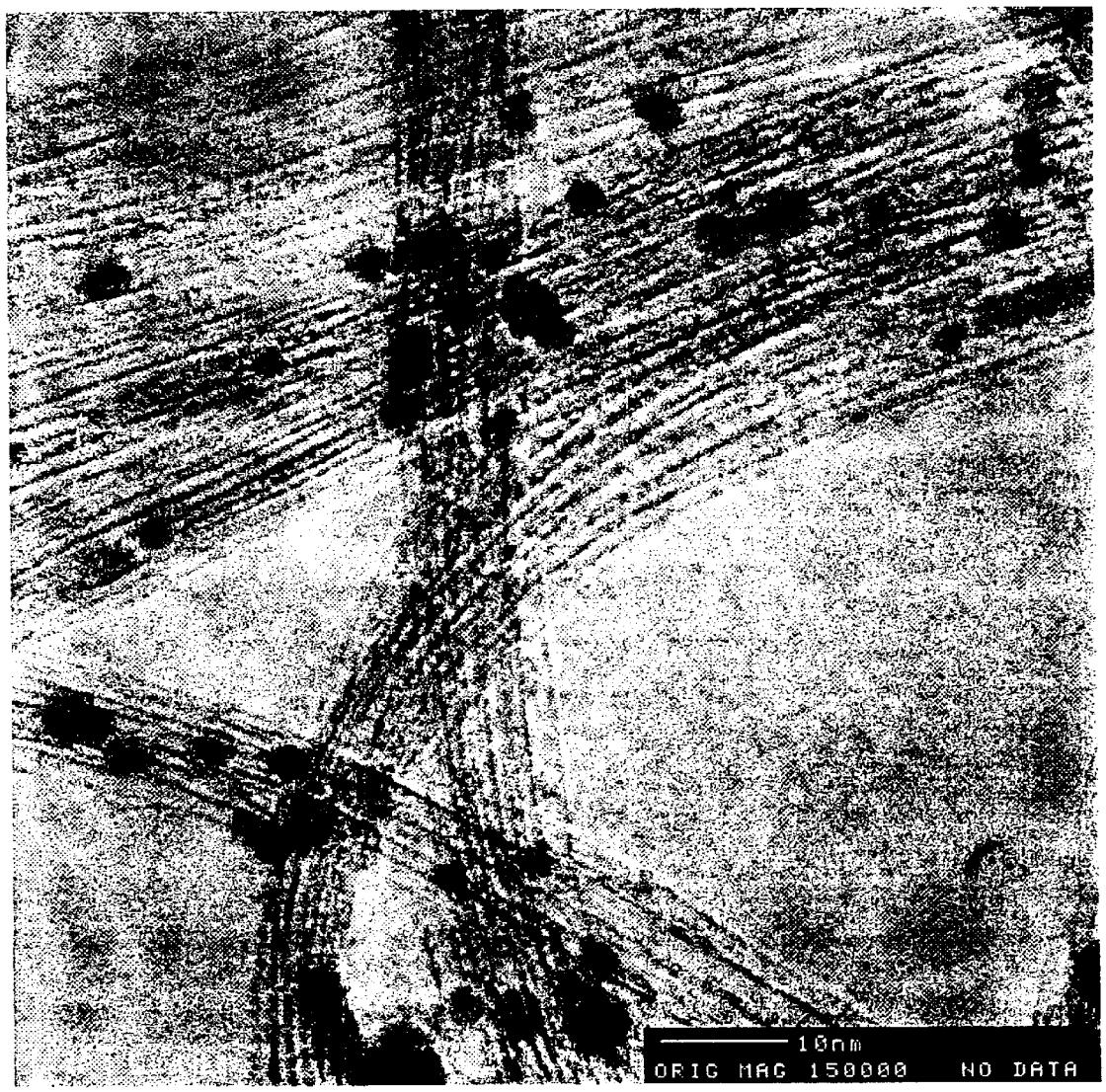

The products of the present invention can be seen in FIG. 8. FIG. 8(a) is a TEM that shows the individual tubes in the product. FIG. 8(b) is a SEM that shows a mass of ropes of tubes in the 0.6 nm to 0.8 nm diameter range.

Carbon nanotubes, and in particular the single-wall carbon nanotubes of this invention, are useful for making electrical connectors in micro devices such as integrated circuits or in semiconductor chips used in computers because of the electrical conductivity and small size of the carbon nanotube. The carbon nanotubes are useful as antennas at optical frequencies, and as probes for scanning probe microscopy such as are used in scanning tunneling microscopes (STM) and atomic force microscopes (AFM). The carbon nanotubes may be used in place of or in conjunction with carbon black in tires for motor vehicles. The carbon nanotubes are also useful as supports for catalysts used in industrial and chemical processes such as hydrogenation, reforming and cracking catalysts. The nanotubes may be used, singularly or in multiples, in power transmission cables, in solar cells, in batteries, as antennas, as molecular electronics, as probes and manipulators, and in composites.

EXAMPLES

In order to facilitate a more complete understanding of the invention, Examples are provided below. However, the scope of the invention is not limited to specific embodiments disclosed in the Examples, which is for purposes of illustration only.

Example 1

This Example employed the apparatus shown in FIGS. 1 and 2 and demonstrates the process of the present invention is useful to product clean SWNTs of small diameter.

Summary of Conditions:

| Operating Pressure: | 600 psi (40 atmospheres) of CO |
| --- | --- |
| Operating Temp. | 900° C. |

Flow Conditions:

Two standard liters per minute (slm) of CO containing 0.5 Torr of $Fe(CO)_5$ were passed through the air-cooled injector. 8 slm of pure CO were preheated in the copper heating coil, and passed through the stainless steel injector manifold. The two flows were mixed in the mixing zone and the combined gases passed through the growth and annealing zone and into the product recovery zone.

| Run time: | 2 hours |
| --- | --- |

Results:

17.5 mg of material was collected from the product recovery zone at the exit of the high pressure reactor. SEM measurements showed that this material was primarily SWNT. EDX and TGA measurements showed that this material contained 3–5 atom % of iron. TEM measurements showed that the narrowest single-walled nanotubes in this product were 0.7 nm in diameter, corresponding to the expected size of a (5,5) carbon nanotube.

Example 2

Using the same apparatus as in Example 1, this Example demonstrates that $Ni(CO)_4$ does not exhibit appreciable catalytic effects under the preferred higher pressure CO process conditions.

Summary of Conditions:

| Operating Pressure: | 450 psi (30 atmospheres) of CO |
| --- | --- |
| Operating Temp. | 1000° C. |

Flow Conditions:

2.5 standard liters per minute (slm) of CO containing 0.4 Torr of $Ni(CO)_4$ were passed through the air-cooled injector. 7.5 slm of pure CO were preheated in the copper heating coil, and passed through the stainless steel injector manifold. The two flows were mixed in the mixing zone and the combined gases passed through the growth and annealing zone and into the product recovery zone.

| Run time: | 2 hours |
| --- | --- |

Results:

Powdery material was collected from the product recovery zone at the exit of the high pressure reactor. This material was not weighed. SEM measurements showed that this material contained no SWNT; it was composed of metal particles overcoated with carbon.

Example 3

Again using the apparatus of Example 1, this Example shows that employing $Ni(CO)_4$ as a nucleating agent substantially improves the productivity of the high pressure CO process.

Summary of Conditions:

| | |
|---|---|
| Operating Pressure: | 450 psi (30 atmospheres) of CO |
| Operating Temp. | 1000° C. |

Flow Conditions:

2.5 standard liters per minute (slm) of CO containing 0.2 Torr of $Fe(CO)_5$ and 0.2 Torr of $Ni(CO)_4$ were passed through the air-cooled injector. 7.5 slm of pure CO were preheated in the copper heating coil, and passed through the stainless steel injector manifold to the mixing zone where it was combined with the injector flow. The combined gases passed through the growth and annealing zone into the product recovery zone.

| | |
|---|---|
| Run time: | 2 hours |

Results:

20.1 mg of material was collected from the product recovery zone at the exit of the high pressure reactor. SEM measurements showed that this materials was primarily SWNT. EDX measurements showed that this material contained 1.2 atom % of iron and 0.6 atom % of nickel. TEM measurements showed that the single-walled nanotubes in this product were 0.8 nm in diameter. Under similar conditions employing only $Fe(CO)_5$, the yield was 3–4 times lower than in this Example.

Example 4

Referring to FIG. 6, the high pressure CO reaction chamber is made of a 2" diameter, 42" long quartz tube inserted through a 3-zone furnace mounted within a 16" O.D., 11" I.D. aluminum cylinder with 3" thick aluminum end flanges. The inside of the quartz tube is maintained at the 10–100 atm operating pressure of CO by control of the mass flow controllers for the main gas flow, and the catalysts addition stream, and by adjusting a throttle valve at the exit. The inside of the aluminum pressure tank is pressurized with inert gas (preferably Ar) so that the external pressure around the quartz reactor tube is never greater than the inside CO pressure by more than 10 psi, nor less than 5 psi. This is accomplished with a differential pressure regulator.

Ferrocene is added through the catalyst addition tube. This is a 0.5" diameter quartz tube with a 5 mm wide exit hole at the end, arranged so as to direct the ferrocene containing CO flow (~1 liter/min) upwards into the oncoming (~10 liter/min) flow of CO in the main portion of the 2" reactor tube. Ferrocene is sublimed from a separately heated section of this addition tube just before it enters the main oven of the high pressure reactor. The partial pressure of ferrocene (0.01 to 0.1 Torr) is controlled by the temperature of this sublimation zone (100–200° C.). As shown, the unfocused beam of a KrF excimer laser (300 mJ/pulse in a 1.5 cm×3 cm rectangular beam profile, 30 pulses per second) is directed down the axis of the quartz tube reactor, passing just above the exit of the catalyst addition tube. The product single-wall carbon nanotube is collected on the cool walls of the quartz reactor tube and on in-line filters as the CO gas exits the oven. The $CO_2$ produced as a result of the Boudouard reaction is removed from the exiting CO gas by a reactive filter. The purified CO gas is then recompressed, purified a final time to remove $H_2$, hydrocarbons, transition metal carbonyls, etc., and recirculated to the quartz reactor tube.

Example 5

An alternative design for large throughput operation may be achieved by having the reactant CO+ ferrocene gas flow at high velocity perpendicular to the KrF excimer laser, thereby allowing a large volume to be excited in a single laser pulse. This utilizes the ability of modem KrF lasers (e.g., Lambda Physik model LPX 325i) to operate at 250 pulses per second, each pulse interacting with yet a new volume of gas. At an initial ferrocene partial pressure of 0.1 Torr, a single laser pulse propagates usefully through a meter of the CO reactant gas, nucleating $Fe_x$ catalyst particles uniformly in a 1 liter volume (assuming a 10 $cm^2$ beam profile). At a large flow velocity of 750 cm per second in the irradiation zone, this 250 Hz laser activates 250 liters per second for efficient single-wall carbon nanotube growth. Assuming every $Fe_x$ catalyst nucleates a single-wall carbon nanotube of average length of 10 microns, and assuming that most of the Fe in the initial ferrocene becomes involved in such a catalyst particle, $Fe_x$, with x~100, this means that roughly 0.1 kg of single-wall carbon nanotube is produced every second in the final collected product downstream. A single-wall carbon nanotube production unit operating just this one KrF laser can be able to deliver several tons of single-wall carbon nanotube per day in continuous operation.

In order to keep the reactant gas temperature under control as the single-wall carbon nanotube are formed in the reactant gas (for Boudouard reaction $\Delta H$--170 kJ per mole of carbon) it is useful to expand the reacting gas by a factor of ~10 after the initial laser nucleation zone is passed. As the gas accelerates toward this expansion point (effectively a long slit nozzle), the desired flow velocity of 750 cm/sec will be easily achieved. After the single-wall carbon nanotube are nucleated and well-established in growing ropes, the need for high pressure CO is largely over. Subsequent growth can then proceed at lower rates in the lower pressure CO, giving enough time for the gas to cool by radiation (the single-wall carbon nanotubes are excellent black body emitters) and by heat exchange with the walls.

The presence of $CO_2$ at a pressure near the thermodynamic equilibrium point will help to eliminate defects from the growing single-wall carbon nanotube. For this reason it may be useful to seed the initial CO gas with a small amount of $CO_2$, and/or inject it downstream of the KrF laser irradiation/nucleation zone.

Example 6

Referring to FIG. 7, by changing the laser beam from the downstream direction to the upstream direction, a "cold injector" for the incoming ferrocene coming in from the upstream direction mounted on the central axis of the quartz tube may be used. The hot CO shower head may be used, but it may be desirable to use a preheater coil for this shower head so that the downstream walls remain clean. With a larger quartz tube, an all-metal "cold injector" may be used with air cooling that achieves ferrocene sublimation at temperatures in the range of about 90–150° C., and an exit temperature of about 500° C. with about 2–3 thermocouples.

On the downstream end of the apparatus, a quartz window is provided for the laser input. A CO purge flow may be necessary to keep this window clean. There is also a need for a collector for the SWNT deposits. This may be achieved with a water-cooled copper cylinder mounted in the quartz tube as the flow exits the oven that also serves to cool the 1000° C. CO. In one embodiment, a 1.5" O.D. copper pipe with about 5 to about 10 turns of ⅛" copper tubing brazed to the outside, with cold water circulating inside the copper tubing, is used.

The production resulting from use of the upstream laser may be limited by the creation of single-wall carbon nanotube "fuzz balls" that flow into the laser beam, slightly attenuating the laser beam. At high yield, and at high production rate, this shadowing will be self-limiting.

The upstream laser, however, will interact with any ferrocene molecules that would otherwise had the chance to fatten the catalyst particles on the still-growing single-wall nanotube product.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification is considered as exemplary only, with the true scope and spirit of the invention being indicated by the following claims.

What is claimed is:

1. A method for producing single wall carbon nanotubes comprising the steps of:
   (a) providing a CO gas stream comprising CO, wherein said CO gas stream is at a pressure greater than about 10 atmospheres;
   (b) providing a gaseous catalyst precursor stream comprising a catalyst precursor;
   (c) mixing the CO gas stream and the gaseous catalyst precursor stream to form a reaction mixture, wherein said mixing step occurs under reaction conditions to form single wall carbon nanotubes; and
   (d) reacting said reaction mixture to form single wall carbon nanotubes.

2. The method of claim 1, wherein the pressure of the CO gas stream is in a range from about 10 atmospheres to about 100 atmospheres.

3. The method of claim 1, wherein the gaseous catalyst precursor stream comprises atoms of a transition metal selected from the group consisting of Group VI metals, Group VII metals, and mixtures thereof.

4. The method of claim 1, wherein said catalyst precursor is a metal-containing compound of a metal selected from the group consisting of tungsten, molybdenum, chromium, iron, nickel, cobalt, rhodium, ruthenium, palladium, osmium, iridium, platinum and mixtures thereof.

5. The method of claim 4, wherein said metal-containing compound is a metal carbonyl.

6. The method of claim 5, wherein said metal carbonyl is selected from the group consisting of $Fe(CO)_5$, $Co(CO)_6$, and mixtures thereof.

7. The method of claim 4, wherein said metal-containing compound is a metallocene.

8. The method of claim 7, wherein the metallocene is selected from the group consisting of ferrocene, cobaltocene, ruthenocene and mixtures thereof.

9. The method of claim 1, wherein said gaseous catalyst precursor stream comprises CO.

10. The method of claim 9, wherein the partial pressure of said catalyst precursor in said gaseous catalyst precursor stream is from about 0.25 Torr to about 100 Torr.

11. The method of claim 9, wherein the partial pressure of said catalyst precursor in said gaseous catalyst precursor stream is up to about 100 Torr.

12. The method of claim 9, wherein the partial pressure of said catalyst precursor in said gaseous catalyst precursor stream is at least about 0.01 Torr.

13. The method of claim 9, wherein the partial pressure of said catalyst precursor in said gaseous catalyst precursor stream is from about 1 Torr to about 10 Torr.

14. The method of claim 1, wherein the concentration of catalyst precursor in the reaction mixture is in the range from about 1 ppm to about 100 ppm.

15. The method of claim 1, wherein the concentration of catalyst precursor in the reaction mixture is in the range from about 10 ppm to about 30 ppm.

16. The method of claim 1, wherein said gaseous catalyst precursor stream is provided at a temperature in the range of from about 70° C. to about 200° C.

17. The method of claim 1, wherein said CO gas stream is provided at a temperature in the range of from about 850° C. to about 1500° C.

18. The method of claim 1, wherein said CO gas stream is provided at a temperature in the range of from about 900° C. to about 1100° C.

19. The method of claim 1, wherein said mixing step heats said catalyst precursor to a temperature above the decomposition temperature of said catalyst precursor in less than about 100 μsec.

20. The method of claim 1, wherein said mixing step heats said catalyst precursor to a temperature above the decomposition temperature of said catalyst precursor in up to about 10 msec.

21. The method of claim 1, wherein said mixing step heats said catalyst precursor to a temperature above the decomposition temperature of said catalyst precursor in between about 1 μsec and about 1 msec.

22. The method of claim 1, wherein the reaction conditions of said mixing step comprises a reaction temperature greater than the decomposition temperature of the catalyst precursor.

23. The method of claim 1, wherein the reaction conditions of said mixing step comprises a reaction temperature in the range of from about 850° C. to about 1250° C.

24. The method of claim 1, wherein a catalyst promoter is added to the reaction mixture.

25. The method of claim 24, wherein the catalyst promoter is selected from the group consisting of thiophene, $H_2S$, volatile lead, bismuth compounds and combinations thereof.

26. The method of claim 1, wherein the CO gas stream further comprises $CO_2$.

27. The method of claim 1, wherein a plurality of the single wall carbon nanotubes have a tube diameter in the range of from about 0.6 nm to about 2 nm.

28. The method of claim 1, wherein a plurality of the single wall carbon nanotubes have a tube diameter in the range of from about 0.6 nm to about 0.8 nm.

29. The method of claim 1, wherein at least 50% of said single wall carbon nanotubes have a diameter in the range of 0.6 nm to 0.8 nm.

30. The method of claim 1, wherein at least 75% of said single wall carbon nanotubes have a diameter in the range of 0.6 nm to 0.8 nm.

31. The method of claim 1, wherein at least 95% of said single wall carbon nanotubes have a diameter in the range of 0.6 nm to 0.8 nm.

32. The method of claim 1, wherein a plurality of said single wall carbon nanotubes have diameters in the range from about the diameter of a (5,5) nanotube to about the diameter of a (10,10) nanotube.

33. The method of claim 1, wherein said formed single wall carbon nanotubes are at least 25% (5,5) nanotubes.

34. The method of claim 1, wherein said formed single wall carbon nanotubes are at least 50% (5,5) nanotubes.

35. The method of claim 1, wherein at least some of the single wall carbon nanotubes are in the form of ropes.

36. A method for producing single wall carbon nanotubes comprising the steps of:
(a) providing a CO gas stream comprising CO, wherein said CO is at a superatmospheric pressure;
(b) providing a gaseous catalyst precursor stream comprising a catalyst precursor, wherein
(i) said catalyst precursor comprises atoms of a transition metal selected from the group consisting of Group VI metals, Group VIII metals and mixtures thereof, and
(ii) said gaseous catalyst precursor stream is provided at a temperature below the decomposition temperature of said catalyst precursor;
(c) heating said CO gas stream comprising CO to a temperature
(i) that is at least above the decomposition temperature of said catalyst precursor and
(ii) that is sufficient to form single wall carbon nanotubes;
(d) mixing said CO gas stream and said gaseous catalyst precursor stream to form a reaction mixture, wherein said mixing step occurs in a mixing zone and wherein said mixing step rapidly heats said catalyst precursor to a temperature that is
(i) above the decomposition temperature of said catalyst precursor,
(ii) sufficient to promote the formation of catalyst metal atom clusters, and
(iii) sufficient to promote the initiation and growth of single wall carbon nanotubes; and
(e) forming solid products comprising the single wall nanotubes that are in a resulting gaseous stream, wherein at least 75% of atoms of the solid products are atoms of the single wall carbon nanotubes.

37. The method of claim 36, further comprising the step of passing said single wall carbon nanotubes in said resulting gaseous stream through a growth and annealing zone.

38. The method of claim 37, wherein the temperature of the growth and annealing zone is in the range from about 850° C. to about 1250° C.

39. The method of claim 37, wherein the pressure of the growth and annealing zone is in the range from about 3 to about 1000 atm.

40. The method of claim 37, wherein the pressure of the growth and annealing zone is in the range from about 5 to about 500 atm.

41. The method of claim 37, wherein the pressure of the growth and annealing zone is in the range from about 10 to about 100 atm.

42. The method of claim 36, further comprising the step of separating and recovering said single wall carbon nanotubes from said resulting gaseous stream.

43. The method of claim 42, wherein the separating and recovering step comprises passing the resulting gaseous stream through a gas permeable filter.

44. The method of claim 37 further comprising the step of separating and recovering said single wall carbon nanotubes from said resulting gaseous stream after passing the single wall carbon nanotubes and resulting gaseous stream through said growth and annealing zone.

45. The method of claim 36 further comprising the step of supplying a nucleating agent to said mixing zone to facilitate the formation of said catalyst metal atom clusters.

46. The method of claim 45, wherein said nucleating agent is a gaseous metal-containing compound.

47. The method of claim 46, wherein said gaseous metal-containing compound is selected from the group consisting of $Ni(CO)_4$, $W(CO)_6$, $Mo(CO)_6$, and mixtures thereof.

48. The method of claim 45, wherein said nucleating agent is laser light photons.

49. The method of claim 36, wherein the CO gas stream is at a pressure range from about 3 atmospheres to about 1000 atmospheres.

50. The method of claim 36, wherein the CO gas stream is at a pressure range from about 10 atmospheres to about 100 atmospheres.

51. The method of claim 36, wherein said catalyst precursor is a metal-containing compound of a metal selected from the group consisting of tungsten, molybdenum, chromium, iron, nickel, cobalt, rhodium, ruthenium, palladium, osmium, iridium, platinum and mixtures thereof.

52. The method of claim 51, wherein said metal-containing compound is a metal carbonyl.

53. The method of claim 52, wherein said metal carbonyl is selected from the group consisting of $Fe(CO)_5$, $Co(CO)_6$, and mixtures thereof.

54. The method of claim 51, wherein said metal-containing compound is a metallocene.

55. The method of claim 54, wherein the metallocene is selected from the group consisting of ferrocene, cobaltocene, ruthenocene and mixtures thereof.

56. The method of claim 36, wherein said gaseous catalyst precursor stream comprises CO.

57. The method of claim 56, wherein the partial pressure of said catalyst precursor in said gaseous catalyst precursor stream is from about 0.25 Torr to about 100 Torr.

58. The method of claim 56, wherein the partial pressure of said catalyst precursor in said gaseous catalyst precursor stream is up to about 100 Torr.

59. The method of claim 56, wherein the partial pressure of said catalyst precursor in said gaseous catalyst precursor stream is at least about 0.10 Torr.

60. The method of claim 56, wherein the partial pressure of said catalyst precursor in said gaseous catalyst precursor stream is from about 1 Torr to about 10 Torr.

61. The method of claim 36, wherein the concentration of catalyst precursor in the reaction mixture is in the range from about 1 ppm to about 100 ppm.

62. The method of claim 36, wherein the concentration of catalyst precursor in the reaction mixture is in the range from about 10 ppm to about 30 ppm.

63. The method of claim 36, wherein said gaseous catalyst precursor stream is supplied at a temperature in the range of from about 70° C. to about 200° C.

64. The method of claim 36, wherein said CO gas stream is supplied at a temperature in the range of from about 850° C. to about 1500° C.

65. The method of claim 36, wherein said CO gas stream is supplied at a temperature in the range of from about 900° C. to about 1100° C.

66. The method of claim 36, wherein said mixing step heats said catalyst precursor to a temperature above the decomposition temperature of said catalyst precursor in less than about 100 $\mu$sec.

67. The method of claim 36, wherein said mixing step heats said catalyst precursor to a temperature above the decomposition temperature of said catalyst precursor in up to about 10 msec.

68. The method of claim 36, wherein the mixing step heats said catalyst precursor to a temperature above the decomposition temperature of said catalyst precursor in between about 1 $\mu$sec and about 1 msec.

69. The method of claim 36, wherein the reaction conditions of said mixing step comprise a reaction temperature in the range of from about 850° C. to about 1250° C.

70. The method of claim 36, wherein a catalyst promoter is added to the reaction mixture.

71. The method of claim 70, wherein the catalyst promoter is selected from the group consisting of thiophene, $H_2S$, volatile lead, bismuth compounds and combinations thereof.

72. The method of claim 36 further comprising the step of controlling the diameter of the single wall carbon nanotubes by controlling the catalyst cluster size at the time the growth reaction is initiated.

73. The method of claim 72, wherein said catalyst cluster size is controlled by a method selected from the group consisting of:
  (a) controlling the partial pressure of CO ($P_{CO}$) in the mixing zone;
  (b) controlling the temperature in the mixing zone;
  (c) controlling the partial pressure of the catalyst precursor ($P_{CAT}$) provided to the mixing zone;
  (d) controlling the partial pressure of nucleating agents ($P_N$) provided to the mixing zone; and
  (e) combinations of the foregoing.

74. The method of claim 72, wherein said catalyst cluster size is controlled by controlling the ratio of the partial pressure of CO ($P_{CO}$) in the mixing zone to the partial pressure of the catalyst precursor ($P_{CAT}$).

75. The method of claim 36, further comprising the step of changing the reaction conditions from a first set of reaction conditions to a second set of reaction conditions, wherein,
  (a) the first set of reaction conditions promote the formation of said catalyst metal clusters during the mixing of said CO gas stream and said catalyst precursor gaseous stream; and
  (b) the second set of reaction conditions promote the formation of single wall carbon nanotubes.

76. The method of claim 36, wherein the CO gas stream further comprises $CO_2$.

77. The method of claim 36, wherein said catalyst precursor is contacted with a laser beam.

78. The method of claim 36, wherein said catalyst precursor is contacted with a laser beam upon entering the mixing zone to dissociate said catalyst precursor.

79. The method of claim 78 further comprising the step of adding $CO_2$ downstream of where the laser beam contacts the catalyst precursor.

80. The method of claim 78 further comprising a step selected from the group consisting of adding $CO_2$ to the CO gas stream, adding $CO_2$ downstream of the where the laser beam contacts the catalyst precursor, and adding $CO_2$ at both locations.

81. The method of claim 36, wherein at least 99% of atoms of the solid products are atoms of the single wall carbon nanotubes.

82. The method of claim 36, wherein a plurality of the single wall carbon nanotubes have a tube diameter in the range of from about 0.6 nm to about 2 nm.

83. The method of claim 36, wherein a plurality of the single wall carbon nanotubes have a tube diameter in the range of from about 0.6 nm to about 0.8 nm.

84. The method of claim 36, wherein at least 50% of said single wall carbon nanotubes have a diameter in the range of 0.6 nm to 0.8 nm.

85. The method of claim 36, wherein at least 75% of said single wall carbon nanotubes have a diameter in the range of 0.6 nm to 0.8 nm.

86. The method of claim 36, wherein at least 95% of said single wall carbon nanotubes have a diameter in the range of 0.6 nm to 0.8 nm.

87. The method of claim 36, wherein a plurality of said single wall carbon nanotubes have diameters in the range from about the diameter of a (5,5) nanotube to about the diameter of a (10,10) nanotube.

88. The method of claim 36, wherein said single wall carbon nanotubes are at least 25% (5,5) nanotubes.

89. The method of claim 36, wherein said single wall carbon nanotubes are at least 50% (5,5) nanotubes.

90. The method of claim 36, wherein the solid products comprise ropes of the single wall carbon nanotubes.

91. A method for producing single wall carbon nanotubes comprising the steps of:
  (a) providing a CO gas stream comprising CO, wherein said CO is at a pressure of about at least 3 atmospheres;
  (b) providing a gaseous catalyst precursor stream comprising a catalyst precursor, wherein
    (i) said catalyst precursor comprises atoms of a transition metal selected from the group consisting of Group VI metals, Group VIII metals and mixtures thereof, and
    (ii) said gaseous catalyst precursor stream being provided at a temperature below the decomposition temperature of said catalyst precursor;
  (c) heating said CO gas stream to a temperature
    (i) that is at least above the decomposition temperature of said catalyst precursor and
    (ii) that is sufficient to form single wall carbon nanotubes;
  (d) mixing said CO gas stream with said gaseous catalyst precursor stream to form a reaction mixture, wherein said mixing step occurs in a mixing zone and wherein said mixing step rapidly heats said catalyst precursor to a temperature that is
    (i) above the decomposition temperature of said catalyst precursor,
    (ii) sufficient to promote the formation of catalyst metal atom clusters and
    (iii) sufficient to promote the initiation and growth of single wall carbon nanotubes;
  (e) supplying a nucleating agent to said mixing zone to facilitate the formation of said catalyst metal atom clusters; and
  (f) forming solid products, wherein greater than about 75% of atoms of the solid products are atoms of the single wall carbon nanotubes.

92. The method of claim 91, wherein the catalyst precursor is selected from the group consisting of metallocenes, metal carbonyls, and mixtures thereof.

93. The method for producing single wall carbon nanotubes comprising the steps of:
  (a) providing a CO gas stream comprising CO, wherein said CO gas stream is at a superatmospheric pressure;
  (b) providing a gaseous catalyst precursor stream comprising a catalyst precursor;

(c) mixing the CO gas stream and the gaseous catalyst precursor stream to form a reaction mixture, wherein said mixing step occurs under reaction conditions to form single wall carbon nanotubes; and (d) reacting said reaction mixture to form carbon products in tubular form, wherein at least 75 atom % of the carbon products in tubular form are single wall carbon nanotubes.

94. The method of claim 93, wherein at least 99 atom % of the solid carbon products in tubular form are single wall carbon nanotubes.

95. The method of claim 93, further comprising the step of passing said single wall carbon nanotubes through a growth and annealing zone.

96. The method of claim 95, wherein the temperature of the growth and annealing zone is in the range from about 850° C. to about 1250° C.

97. The method of claim 95, wherein the pressure of the growth and annealing zone is in the range from about 3 to about 1000 atm.

98. The method of claim 95, wherein the pressure of the growth and annealing zone is in the range from about 5 to about 500 atm.

99. The method of claim 95, wherein the pressure of the growth and annealing zone is in the range from about 10 to about 100 atm.

100. The method of claim 93, wherein the reacting step forms the carbon products in a resulting gaseous stream, and said method further comprises the step of separating and recovering said single wall carbon nanotubes from the resulting gaseous stream.

101. The method of claim 93, wherein said mixing step occurs in a mixing zone and said method further comprises the step of supplying a nucleating agent to said mixing zone to facilitate the formation of catalyst metal atom clusters.

102. The method of claim 93, wherein said catalyst precursor is a metal-containing compound comprising a metal selected from the group consisting of tungsten, molybdenum, chromium, iron, nickel, cobalt, rhodium, ruthenium, palladium, osmium, iridium, platinum and mixtures thereof.

103. The method of claim 102, wherein said metal-containing compound is a metal carbonyl.

104. The method of claim 103, wherein said metal carbonyl is selected from the group consisting of $Fe(CO)_5$, $Co(CO)_6$, and mixtures thereof.

105. The method of claim 102, wherein said metal-containing compound is a metallocene.

106. The method of claim 105, wherein the metallocene is selected from the group consisting of ferrocene, cobaltocene, ruthenocene and mixtures thereof.

107. The method of claim 93, wherein said gaseous catalyst precursor stream comprises CO.

108. The method of claim 93, wherein at least 50% of said single wall carbon nanotubes have a diameter in the range of 0.6 nm to 0.8 nm.

109. The method of claim 93, wherein at least 75% of said single wall carbon nanotubes have a diameter in the range of 0.6 nm to 0.8 nm.

110. The method of claim 93, wherein at least 95% of said single wall carbon nanotubes have a diameter in the range of 0.6 nm to 0.8 nm.

111. The method of claim 93, wherein a plurality of said single wall carbon nanotubes have diameters in the range from about the diameter of a (5,5) nanotube to about the diameter of a (10,10) nanotubes.

112. The method of claim 93, wherein said single wall carbon nanotubes are at least 25% (5,5) nanotubes.

113. The method of claim 93, wherein said single wall carbon nanotubes are at least 50% (5,5) nanotubes.

114. The method of claim 93, wherein the carbon products comprise ropes of single wall carbon nanotubes.

115. A method for producing single wall carbon nanotubes comprising the steps of:

(a) providing a CO gas stream comprising CO, wherein said CO gas stream is at a superatmospheric pressure;

(b) providing a gaseous catalyst precursor stream comprising a catalyst precursor;

(c) mixing the CO gas stream and the gaseous catalyst precursor stream to form a reaction mixture, wherein said mixing step occurs under reaction conditions to form single wall carbon nanotubes; and (d) reacting said reaction mixture stream to form carbon products in tubular form, wherein at least 99 atom % of the carbon products in tubular form are single wall carbon nanotubes.

* * * * *

UNITED STATES PATENT AND TRADEMARK OFFICE
CERTIFICATE OF CORRECTION

| | |
|---|---|
| PATENT NO. | : 6,761,870 B1 |
| APPLICATION NO. | : 09/830642 |
| DATED | : July 13, 2004 |
| INVENTOR(S) | : Richard E. Smalley et al. |

It is certified that error appears in the above-identified patent and that said Letters Patent is hereby corrected as shown below:

Column 17, Line 50, Claim 3, please replace "Group VII" with --Group VIII--.

Signed and Sealed this

Eleventh Day of March, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,761,870 B1 | Page 1 of 1 |
| APPLICATION NO. | : 09/830642 | |
| DATED | : July 13, 2004 | |
| INVENTOR(S) | : Richard E. Smalley et al. | |

It is certified that error appears in the above-identified patent and that said Letters Patent is hereby corrected as shown below:

Column 1, Line 11 insert:

--Statement Regarding Federally Sponsored Research or Development

This invention was made with government support under Grant No. NCC9-77 awarded by the National Aeronautics and Space Administration (NASA). The government has certain rights in the invention.--

Signed and Sealed this
Fifteenth Day of May, 2012

David J. Kappos
*Director of the United States Patent and Trademark Office*